US006681336B1

United States Patent
Nakazato et al.

(10) Patent No.: US 6,681,336 B1
(45) Date of Patent: Jan. 20, 2004

(54) SYSTEM AND METHOD FOR IMPLEMENTING A USER SPECIFIED PROCESSING SPEED IN A COMPUTER SYSTEM AND FOR OVERRIDING THE USER SPECIFIED PROCESSING SPEED DURING A STARTUP AND SHUTDOWN PROCESS

(75) Inventors: Ryu Nakazato, Yokohama (JP); Mayumi Maeda, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 586 days.

(21) Appl. No.: 09/595,931

(22) Filed: Jun. 16, 2000

(30) Foreign Application Priority Data

Jun. 18, 1999 (JP) .......................... 11-173015
Oct. 21, 1999 (JP) .......................... 11-299700

(51) Int. Cl.⁷ .................................. G06F 1/32
(52) U.S. Cl. ......................... 713/322; 713/1
(58) Field of Search .................. 713/300, 320, 713/322, 500, 501, 502

(56) References Cited

U.S. PATENT DOCUMENTS

| | | | | |
|---|---|---|---|---|
| 5,167,024 A | * | 11/1992 | Smith et al. ................. | 713/322 |
| 5,546,568 A | * | 8/1996 | Bland et al. ................. | 713/501 |
| 5,754,869 A | | 5/1998 | Holzhammer et al. | |
| 5,768,602 A | | 6/1998 | Dhuey | |
| 5,768,613 A | * | 6/1998 | Asghar ........................ | 712/35 |
| 5,835,885 A | * | 11/1998 | Lin .............................. | 702/99 |
| 5,845,111 A | * | 12/1998 | Lin et al. ..................... | 713/501 |
| 6,044,417 A | * | 3/2000 | Muljono et al. .............. | 710/52 |
| 6,442,700 B1 | * | 8/2002 | Cooper ........................ | 713/320 |

FOREIGN PATENT DOCUMENTS

| | | | | |
|---|---|---|---|---|
| JP | 10-124200 | | 5/1998 | |
| JP | 11-259162 | | 9/1999 | |
| JP | 2001117663 A | * | 4/2001 | ............. G06F/1/04 |

OTHER PUBLICATIONS

Intel, Mobile Pentium III Processor in BGA2 and Mirco–PGA2 Packages, 2000.*

* cited by examiner

*Primary Examiner*—Dennis M. Butler
*Assistant Examiner*—Mark Connolly
(74) *Attorney, Agent, or Firm*—Finnegan, Henderson, Farabow, Garrett & Dunner, L.L.P.

(57) ABSTRACT

The CPU operates at the highest speed in start processing of an operating system. When a power-saving driver receives a start completion message from the operating system, the power-saving driver waits for a predetermined period until user operation to a computer system is enabled, and then sets the processing speed of the CPU to a user-designated speed. When the power-saving driver receives from the OS an OS termination start message representing the start of shutdown processing, the power-saving driver cancels setting of the user-designated speed, and returns the CPU to, e.g., the highest speed. Hence, start processing/shutdown processing can be executed at a high speed regardless of the set value of the user-designated speed.

21 Claims, 16 Drawing Sheets

SYSTEM AND METHOD FOR IMPLEMENTING A USER SPECIFIED PROCESSING SPEED IN A COMPUTER SYSTEM AND FOR OVERRIDING THE USER SPECIFIED PROCESSING SPEED DURING A STARTUP AND SHUTDOWN PROCESS

CROSS-REFERENCE TO RELATED APPLICATIONS

This application is based upon and claims the benefit of priority from the prior Japanese Patent Applications No. 11-173015, filed Jun. 18, 1999; and No. 11-299700, filed Oct. 21, 1999, the entire contents of which are incorporated herein by reference.

BACKGROUND OF THE INVENTION

The present invention relates to a computer system such as a personal computer and, more particularly, to a computer system capable of setting the processing speed to a processing speed designated by user operation, and a processing speed control method therefor.

In recent years, various portable laptop or notebook type battery-operable personal computers (to be referred to as PCs hereinafter) have been developed. For PCs of this type, high-speed (high-performance) CPUs have been developed. This allows the user to easily obtain a comfortable use environment.

However, a higher-speed CPU requires higher power consumption, increasing the power consumption amount of the whole PC and decreasing the battery operating time.

Recently, in order to save power, a technique for setting the processing speed of the system to a predetermined processing speed designated by user operation has been developed. The processing speed of the system can be set to one of a plurality of speed levels from the highest to lowest speeds by, e.g., intermittently operating the CPU at a predetermined period or switching the operating frequency or voltage of the CPU. Which of speed levels is to be used during the user job period is determined by user's designation.

However, in a conventional system, the processing speed designated by user operation effectively acts even during a period in which the user cannot actually operate the computer system, for example, during the start or shutdown period of the computer system. For this reason, start or shutdown processing of the computer system requires a long time.

When the CPU speed is switched to the highest speed by user's designation or another predetermined factor after the CPU operates at a low speed during system start processing, normal operation may not be assured depending on the operating system or drivers. This is because most of operating systems and drivers obtain an absolute time necessary for a device response wait by software using a software loop counter.

More specifically, the operating system or driver calculates and registers in system start processing a time necessary for repetitively executing a specific instruction N times. In actually accessing a device, the repetitive execution number of the instruction necessary for a device response wait is determined using the registered information. If the CPU speed is set, e.g., twice as high as the speed in system start processing, the actual wait time becomes half the expected value even when the specific instruction is repetitively executed the same number of times. To normally operate a device, at least a wait time equal to or longer than the wait time defined by the device must be assured.

Even if system start processing is executed at a CPU speed which is not the highest, and then the CPU speed is increased by user's designation or another predetermined factor, device operation fails. In some cases, a serious error occurs such that an instruction or data cannot be normally read.

BRIEF SUMMARY OF THE INVENTION

Accordingly, it is an object of the present invention to provide a computer system for implementing high-speed start processing or the like, and a CPU speed control method therefor.

It is another object of the present invention to provide a computer system for improving the reliability of system operation, and a CPU speed control method therefor.

According to one aspect of the present invention, there is provided a computer system comprising: means for designating a user to designate a processing speed of a processor; means for controlling the processing speed of the processor; and means for setting the processing speed by the means for controlling, setting the processing speed to a highest speed during a period for start processing of an operating system for the computer system, and the processing speed to the user-designated speed during a period other than that for the start processing of the operating system.

According to another aspect of the present invention, there is provided a computer system comprising: means for designating a user to designate a processing speed of a processor; means for setting the processing speed of the processor; and means for setting the processing speed by the means for controlling, setting the processing speed to a highest speed during a period for shutdown processing/ suspend processing of the computer system, and the processing speed to the user-designated speed during a period other than that for the shutdown processing/suspend processing.

According to still another aspect of the present invention, there is provided a processing speed control method applied to a computer system, comprising the steps of: designating a user to designate a processing speed of a processor; and operating the processor at a highest speed during a period for start processing of an operating system for the computer system, and operating the processor at the user-designated speed during a period other than that for the start processing of the operating system.

According to still another aspect of the present invention, there is provided a processing speed control method applied to a computer system, comprising the steps of: designating a user to designate a processing speed of a processor; and operating the processor at a highest speed during a period for shutdown processing/suspend processing of the computer system, and operating the processor at the user-designated speed during a period other than that for the shutdown processing/suspend processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

Preferred embodiments of the present invention will be described below with reference to the several views of the accompanying drawing.

Figure 1:
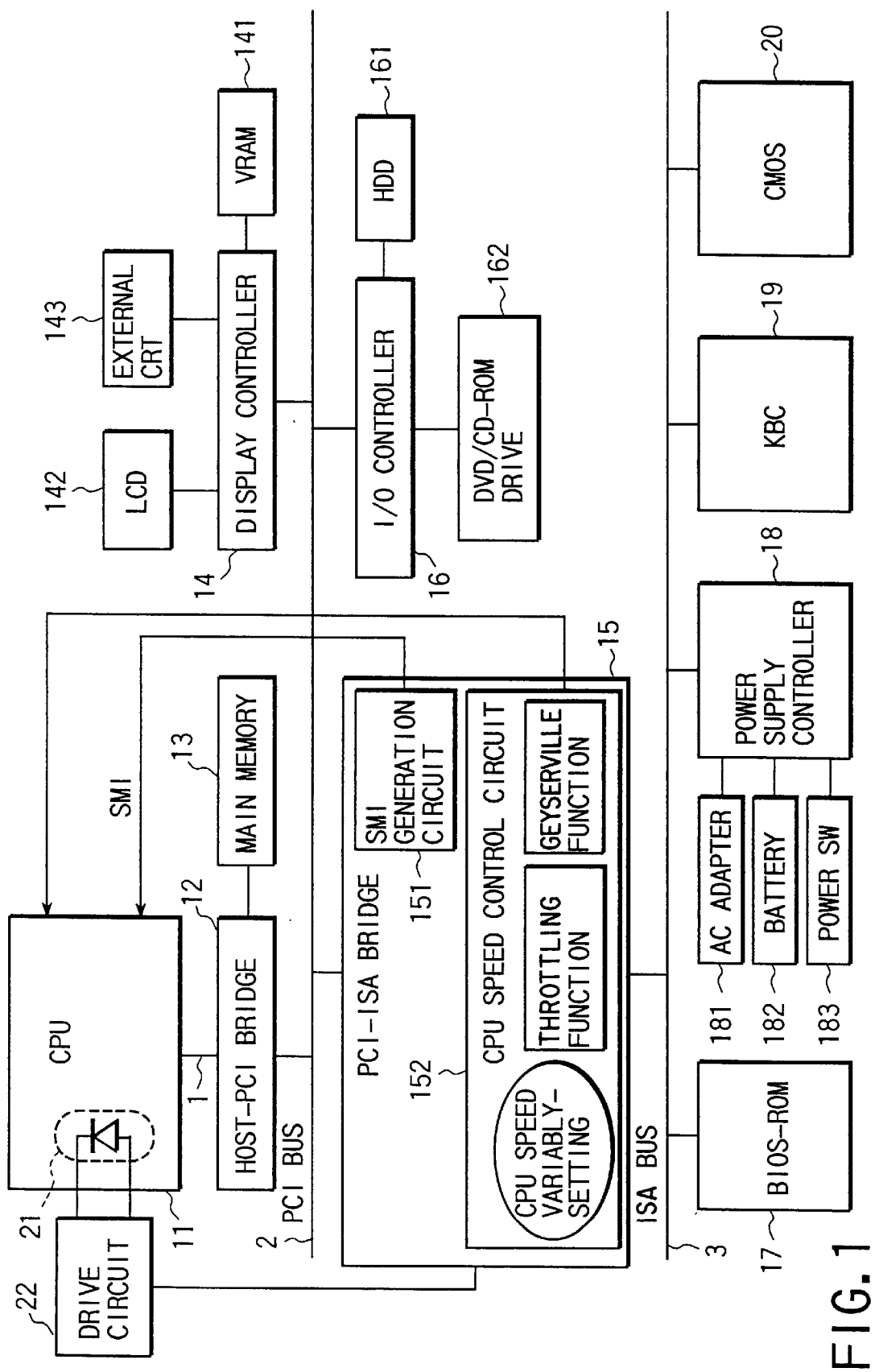
FIG. 1 is a block diagram showing the arrangement of a computer system common to both the first and second embodiment of the present invention.

FIG. 1 shows the arrangement of a computer system common to both the first and second embodiments of the present invention.

This computer system is a battery-operable notebook type personal computer (PC). When power is externally supplied via an AC adapter 181, the PC operates by the external power, and a battery 182 is charged. When the AC adapter 181 is not connected to the PC main body, e.g., the PC is used in a mobile environment, the PC operates by power from the battery 182.

As shown in FIG. 1, the PC main body includes a processor bus 1, PCI bus 2, ISA bus 3, CPU 11, host-PCI bridge 12, main memory 13, display controller 14, PCI-ISA bridge 15, I/O controller 16, BIOS-ROM 17, power supply controller 18, keyboard controller (KBC) 19, and CMOS memory 20.

The CPU 11 controls the operation of the whole PC, and executes the BIOS in the BIOS-ROM 17, an operating system loaded to the main memory 13, and various other programs. This system can control the processing speed of the CPU 11 at multiple stages (a plurality of levels). The CPU speed is controlled using a CPU throttling function (to be described later) and a function called a speed-step or GEYSERVILLE function.

The CPU speed level to be used is determined by user's designation or another predetermined factor. This system operates the CPU 11 at a predetermined arbitrary processing speed (e.g., highest speed) regardless of the user-designated processing speed during a period except for a user operable period. The CPU speed variably-setting function will be described in detail below.

The CPU 11 in FIG. 1 includes the following system management functions.

That is, the CPU 11 includes a real mode, protected mode, and virtual 86 mode for executing an application program or a program such as an OS, and in addition an operation mode called a system management mode (SMM) for executing a system management program.

In the real mode, a maximum of a 1-Mbyte memory space can be accessed. A physical address is determined by an offset value from a base address represented by a segment register. In the protected mode, a maximum of a 16-Mbyte memory space can be accessed. A linear address is determined using an address mapping table called a descriptor table. This linear address is finally converted into a physical address by paging. In the virtual 86 mode, a program written to operate in the real mode is operated in the enhanced mode. A program in the real mode is processed as one task in the enhanced mode.

The system management mode (SMM) is a pseudo real mode in which no descriptor table is referred to and no paging is executed. When a system management interrupt (SMI) is issued to the CPU 11, the operation mode of the CPU 11 is switched from the real, protect, or virtual 86 mode to the SMM. In the SMM, a system management program is executed.

The SMI is a kind of non-maskable interrupt NMI, which is an interrupt having the highest priority, compared to a normal NMI or maskable interrupt INTR. This SMI can be issued to start various SMI service routines prepared as system management programs independently of a running application program or the OS environment.

The host-PCI bridge 12 is a bridge device for bidirectionally connecting the CPU bus 1 and PCI bus 2. The host-PCI bridge 12 incorporates a memory control function for access-controlling the main memory 13.

The main memory 13 stores an operating system, application programs/utilities to be processed, drivers, data created by these programs, and the like. When the CPU 11 shifts to the SMM, the CPU status, i.e., the register of the CPU 11 upon generation of an SMI is saved with a stack format in an SMRAM mapped into a predetermined address space in the main memory 13. This SMRAM stores an instruction for calling the system management program of the BIOS-ROM 17. This instruction is executed first when the CPU 11 shifts to the SMM. By executing this instruction, the control shifts to the system management program.

The display controller 14 displays display data stored in an image memory (VRAM) 141 on one or both of an LCD 142 and external CRT 143 attached to the PC main body. The display controller 14 can operate as the bus master of the PCI bus 2.

The PCI-ISA bridge 15 connects the PCI bus 2 and ISA bus 3, and can operate as the bus master of the PCI bus 2. The PCI-ISA bridge 15 includes an SMI generation circuit 151 and CPU speed control circuit 152.

The SMI generation circuit 151 generates an SMI signal to the CPU 11. The SMI signal is generated by a software SMI, an I/O trap SMI, or an SMI caused by a specific hardware event.

The software SMI is generated using a register or down counter accessible by software. That is, when software writes data in the internal register of the SMI generation circuit 151, an SMI signal is generated. Further, when a value corresponding to a time till generation of an SMI signal is set in the internal down counter of the SMI generation circuit 151, an SMI signal is generated in time-out.

The I/O trap SMI is generated by executing an IN or OUT instruction by software using a predetermined I/O address. An I/O address value to be monitored at which an I/O trap SMI is wanted to be generated is set in the SMI generation circuit 151. Then, when this I/O address is accessed, the I/O trap SMI can be generated.

The SMI by a specific hardware event is generated by hardware upon occurrence of an event necessary for system management, e.g., upon a change in CPU temperature or insertion/removal of the AC adapter 181.

The CPU speed control circuit 152 controls the processing speed of the CPU 11, and has a throttling controller for switching the CPU speed using the "CPU throttling function", and a frequency/voltage controller for switching the CPU speed using the "GEYSERVILLE" function.

These functions are used to variably set the processing speed of the CPU 11 using the "CPU speed variably-setting function" according to the present invention.

1) "CPU Throttling Function"

The "CPU throttling function" is a function of switching the average CPU processing speed by performing intermittent operation of operating/stopping the CPU 11 at a predetermined interval. This function may be called an interval stop clock function or intermittent operation function.

A state in which the "CPU throttling function" is disabled, i.e., the CPU 11 always operates corresponds to the highest speed of the CPU 11. A state in which the "CPU throttling" is enabled at an arbitrary % (ratio of the stopped state to the operating state) corresponds to a speed which is not the highest speed. By changing the ratio of the stopped state to the operating state, the CPU speed can be controlled at multiple stages.

In this system, a state in which the CPU 11 always operates is defined as a default state. The CPU 11 always operates at the highest speed until the "CPU throttling" starts. The operating/stopped state of the CPU 11 is switched using a stop clock signal (STPCLK). The stop clock signal (STPCLK) is a clock state control signal supported by CPU 486SL or Pentium™ available from INTEL Corp.

2) "GEYSERVILLE Function"

The "GEYSERVILLE function" is the function of CPU MobilePentium3™ available from INTEL Corp., and dynamically switches the operating frequency and voltage of the CPU. A state in which the operating frequency and voltage are set to high-order ones supported by the CPU corresponds to the highest speed of the CPU. A state in which the operating frequency and voltage are set to low-order ones corresponds to a speed which is not the highest speed.

In the use of either the function 1) or 2), the CPU speed can be switched by writing necessary data in the internal register of the CPU speed control circuit 152.

The PCI-ISA bridge 15 has a function of monitoring the CPU temperature using a temperature sensor 21 and its drive circuit 22, and a function of monitoring insertion/removal of the AC adapter via the power supply controller 18. When the CPU temperature reaches a predetermined temperature or more, or the AC adapter is removed to turn off the AC adapter power supply, the PCI-ISA bridge 15 notifies the system BIOS by an SMI of occurrence of a warning event which influences the safety of system operation. In this case, processing of forcibly decreasing the CPU speed is done under the control of the system BIOS.

The I/O controller 16 incorporates a bus master IDE controller for controlling an IDE device such as an HDD 161. The bus master IDE controller can operate as a bus master for data transfer between the HDD 161 and the main memory 13. The I/O controller 16 can also control DVD and CD-ROM drives. The HDD 161 records setting information managed by the operating system, in addition to various programs and data.

The BIOS-ROM 17 stores a system BIOS (Basic Input/Output System), and is constituted by a flash memory so as to rewrite a program. The system BIOS operates in the real mode. This system BIOS includes a POST (Power-On Self Test) routine executed in powering on or restarting the system, a device driver for controlling various I/O devices, a BIOS setup routine for setting the system environment, and a system management program (run time) for executing various SMI processes.

The BIOS setup routine presents to the user a setup window including various setting items such as setting of the CPU speed, thereby setting the system to a user-designated environment.

The power supply controller 18 controls power-on/off operation of the PC, and has a state monitoring function of monitoring ON/OFF operation of a power switch 183, the residual capacity of the battery 182, insertion/removal of the AC adapter 181, and ON/OFF operation of the open/close detection switch of the display panel.

The keyboard controller (KBC) 19 controls the keyboard and mouse. The CMOS memory 20 holds various pieces of system setting information, and is backed up by its own battery. CPU speed information designated by the user is saved in, e.g., the CMOS memory 20.

The above-described arrangement is common to both the first and second embodiments.

Next, the arrangement related to the first embodiment will be described below.

In the first embodiment, variable setting of the processing speed of the CPU 11 in the CPU speed control circuit 152 is executed by, e.g., a power-saving driver (program) which runs on the operating system. This power-saving driver originally sets the processing speed of the CPU 11 to a user-designated speed. In the first embodiment, the power-saving driver has the above-mentioned CPU speed variably-setting function of operating the CPU 11 at a predetermined arbitrary processing speed (e.g., highest speed) regardless of the user-designated processing speed during a period except for a user operable period. The power-saving driver controls the CPU speed control circuit 152 via the system BIOS or directly without the mediacy of the system BIOS.

Figure 2:
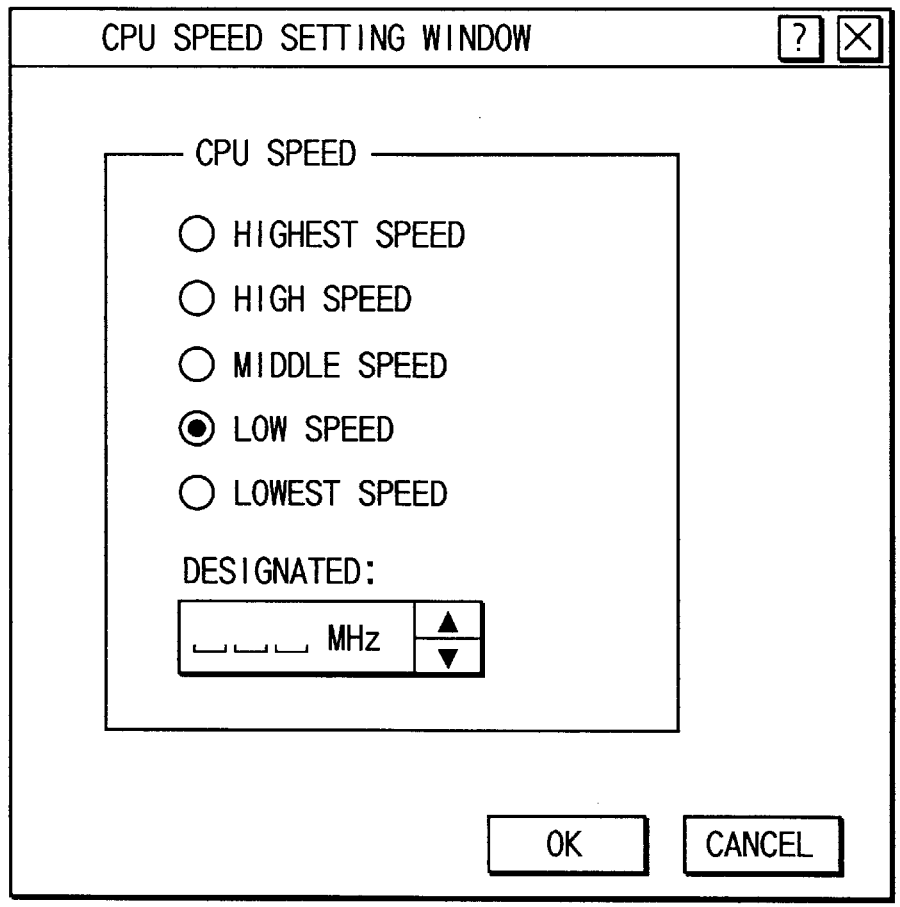
FIG. 2 is a view showing an example of a CPU speed setting window for the user in the first embodiment.

Setting processing of the CPU speed by the user may be done using the above-described BIOS setup routine. The first embodiment assumes that setting processing of the CPU speed by the user is done using the power-saving driver. In practice, the power-saving driver itself does not present a setting window including various power-saving setting items to the user, but a setting window like the one shown in FIG. 2 is presented via a dedicated program such as a power-saving utility. CPU processing speed information set by GUI operation by the user is recorded in a predetermined area (e.g., registry area) of the HDD 161 to which the power-saving driver can refer.

<Principle of System Control Method in First Embodiment>

Figure 3:
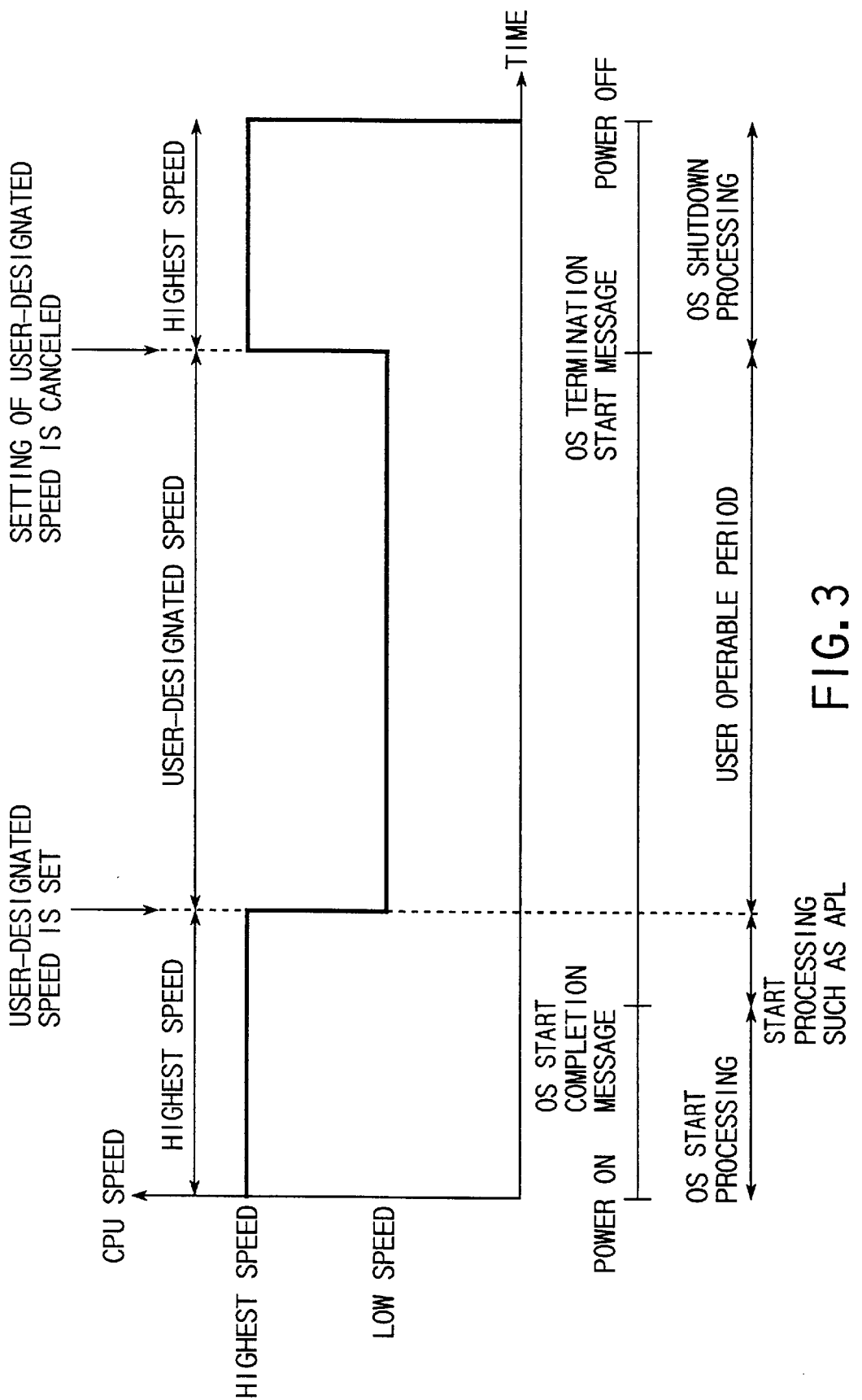
FIG. 3 is a view for explaining the principle of system control method used in the first embodiment.

The principle of system control method used in the first embodiment will be explained with reference to FIG. 3.

If a system start event (power-on operation, reset, restart, or the like) occurs, POST processing (hardware check and initialization processing) is executed by the system BIOS, and start processing (OS bootstrap sequence) of the operating system (OS) starts. At this time, the CPU 11 operates at a predetermined default speed. In the first embodiment, the highest speed is selected as the default speed of the CPU 11, and the CPU 11 automatically operates at the highest speed until the power-saving driver performs setting processing.

The OS bootstrap sequence has several stages. Start processing of the OS itself is completed via load of a kernel, load of various device drivers, and their initialization processing. In loading device drivers, the power-saving driver of this embodiment is also loaded.

The power-saving driver detects completion of start processing of the OS itself upon reception of a start completion message from the OS. The start completion message changes depending on the type of OS in use. In many cases, a plurality of messages are issued from the OS at an interval in accordance with the stage of start processing. Thus, the final detectable message is detected as an OS start completion message. For example, in Windows 95/98™ available from Microsoft Corp., a message Sys_VM_Init is preferably used as an OS start completion message. Sys_VM_Init notifies each driver (VxD) of initialization of a virtual machine (System VM).

If the power-saving driver detects from the OS start completion message that OS start processing is substantially completed, the driver waits for the lapse of a predetermined period necessary for enabling the user operating the computer system. Then, the power-saving driver-sets the processing speed of the CPU 11 to a processing speed for normal processing in accordance with the user-designated processing speed. When the user designates a low speed, the processing speed of the CPU 11 changes from the highest speed to a low one. When the user designates the highest speed, the processing speed is maintained at the highest one.

When the user sets a low speed for battery operation and a high speed for operation by an external AC power supply, the processing speed set in normal processing changes depending on the presence/absence of the AC adapter 181.

The power-saving driver waits for the lapse of a predetermined period upon completion of OS start processing because of the following reason. In starting the computer system, start processing of various system control programs resident for network control and sound control, and start processing of application programs set to automatically start are performed upon completion of OS start processing. Thus, user operation is not enabled immediately upon completion of OS start processing.

A time (timer value) necessary for enabling user operation is a time enough to complete the remaining OS processing, and start processing of various system control programs and application programs. Further, the time is as short as not to unnecessarily increase power consumption. This time length changes depending on the CPU speed, the type of OS, and the like. In the first embodiment, the timer value is determined in advance using a measured value obtained by actual measurement before the computer system is shipped. The timer value is recorded on the HDD 161 as one of pieces of setting information (registry) managed by the OS.

Under this control, the CPU 11 can be operated at a predetermined arbitrary processing speed (highest speed in this embodiment) regardless of the user-designated speed (including designation that the speed is low in battery operation, and is high in operation by an external AC power supply) until a user job is enabled. This can shorten a time required to enable the user job upon power-on operation. The total power consumption until user job is enabled is given by:

Power Consumption Per Unit Time×Processing Time

Even if start processing is executed at the highest speed, the battery operable user job period is the same as that when start processing is executed at a low speed.

If a system termination event (power-off operation or shutdown command) occurs, OS termination processing (shutdown processing) starts. In this shutdown processing, the OS notifies each driver of an OS termination start message representing the start of shutdown processing. In Windows 95/98™ available from Microsoft Corp., a message Sys_VM_Terminal is preferably used as an OS termination start message. Sys_VM_Terminal notifies each driver (VxD) that the virtual machine (System VM) is shut down. This message is issued first in shutdown processing.

Immediately upon reception of the OS termination start message from the OS, the power-saving driver cancels setting of the user-designated speed, and returns the CPU 11 to its default processing speed. Subsequent shutdown processing is executed at the default processing speed (highest speed in the first embodiment) regardless of the user-designated speed. Hence, shutdown processing can be executed at a high speed regardless of the set value of the user-designated speed. Note that the system is automatically powered off upon completion of shutdown processing, so that the CPU processing speed set at the start of shutdown processing is not necessarily the highest speed.

<Processing Speed Control by Power-Saving Driver>

Figures 4A, 4B:
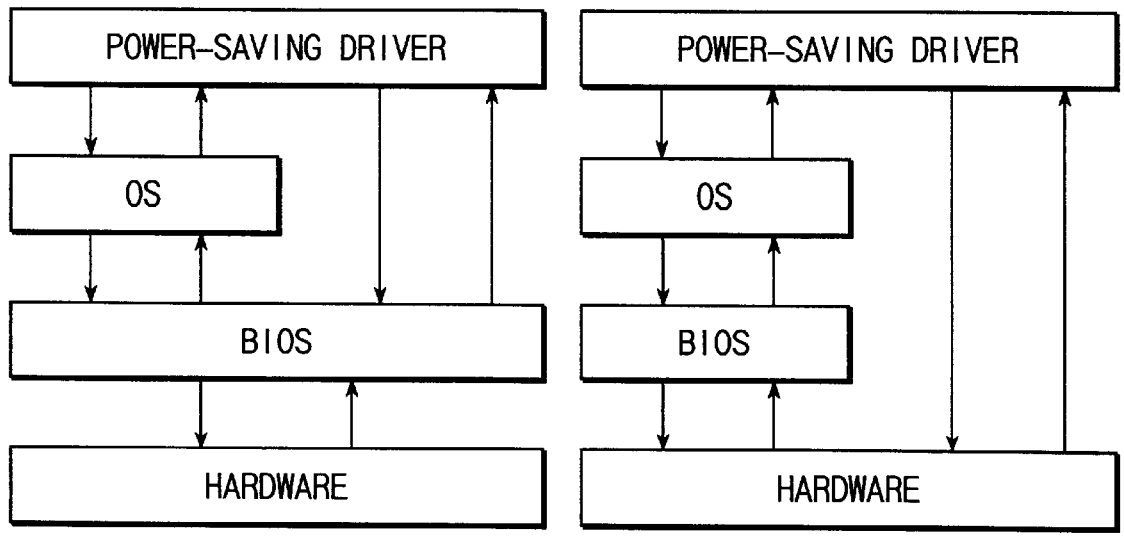
FIGS 4A and 4B are block diagrams each showing the logical relationship between a power-saving driver, OS, BIOS, and hardware used in the first embodiment.

FIGS. 4A and 4B show the logical relationship between the power-saving driver, OS, BIOS, and hardware.

FIG. 4A shows an example in which the CPU processing speed is variably set by controlling hardware (CPU speed control circuit 152) by the power-saving driver via the BIOS. In this case, the power-saving driver mounts an interface with the BIOS using the above-described SMI or the like. FIG. 4B shows an example in which the CPU processing speed is variably set by directly controlling hardware (CPU speed control circuit 152) by the power-saving driver without the mediacy of the BIOS.

<Control Flow from Start to Termination>

Figure 5:
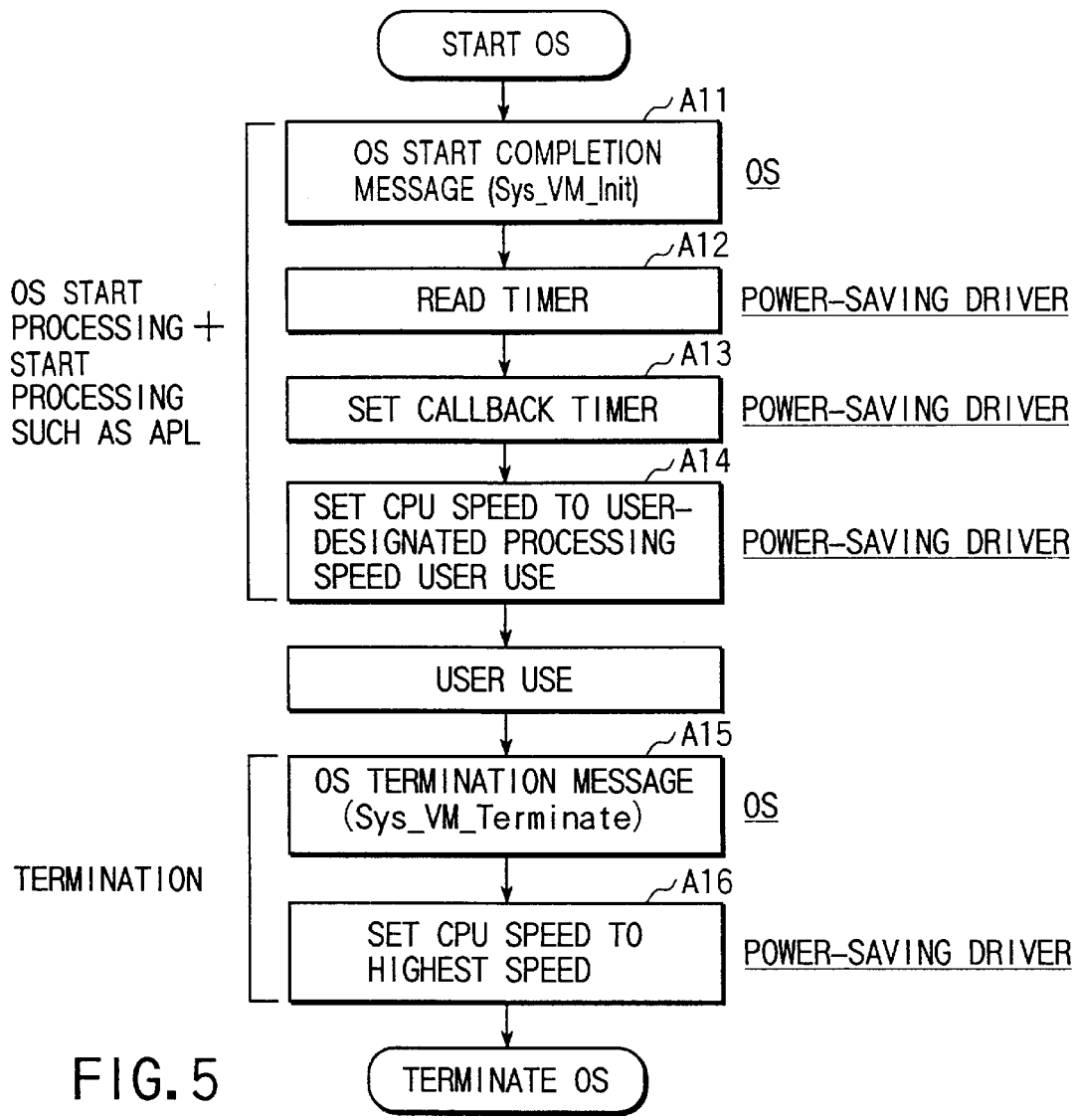
FIG. 5 is a flow chart showing the flow of a series of control operations executed from the start to the termination of the system in the first embodiment.
Figure 6:
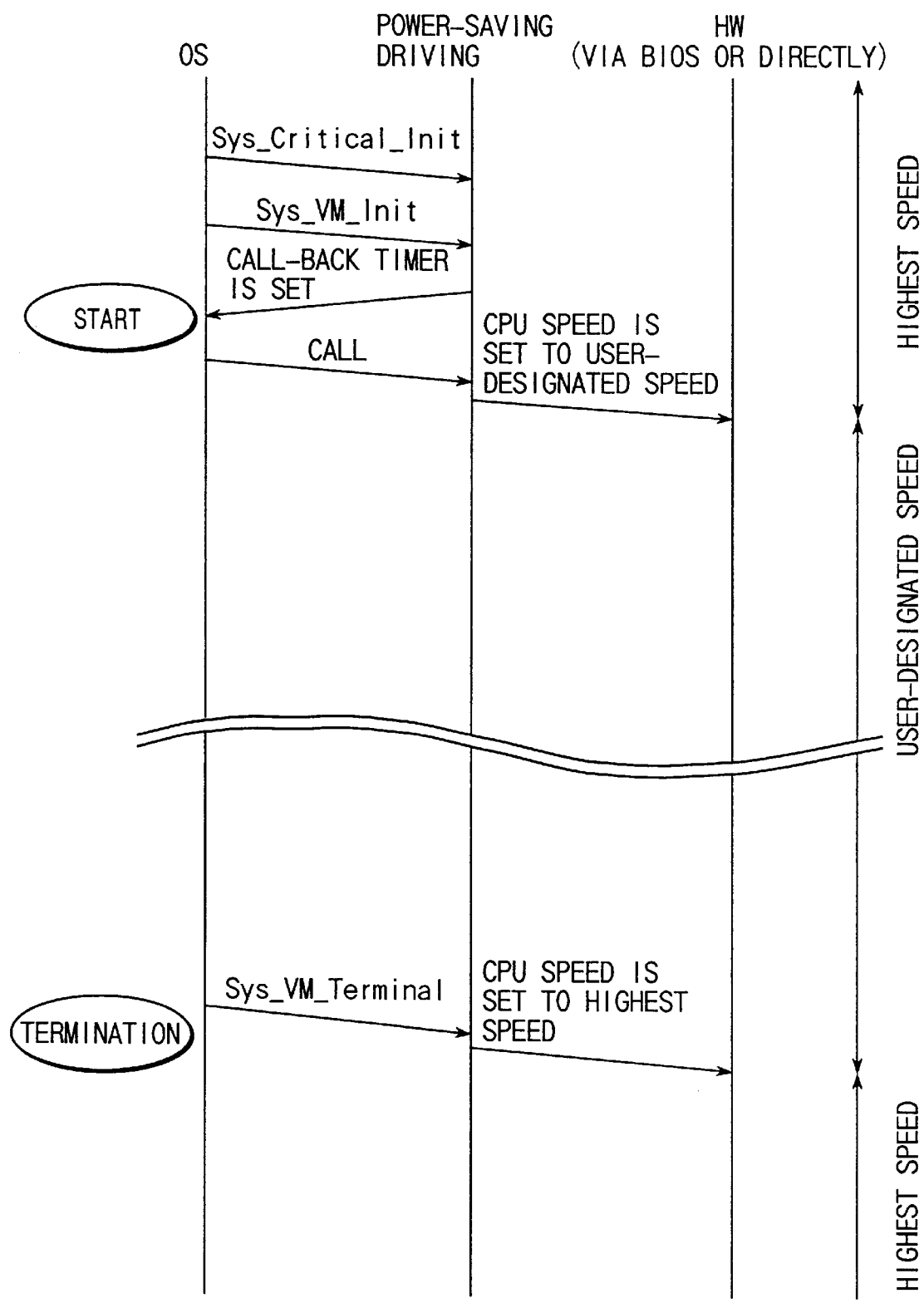
FIG. 6 is a view showing a processing sequence when attention is given to exchange of messages between the OS and power-saving driver used in the system of the first embodiment.

The procedures of the system control method according to the first embodiment will be explained with reference to FIGS. 5 and 6. FIG. 5 is a flow chart showing the flow of a series of control operations executed from the start to the termination of the computer system. FIG. 6 is a view showing a processing sequence when attention is given to exchange of messages between the OS and the power-saving driver.

As described above, OS start processing includes a plurality of stages, and the OS issues messages at various stages. In Windows 95/98 used as an OS, the power-saving driver responds to two messages Sys_Critical_Init and Sys_VM Init in system start. Sys_Critical_Init notifies each driver (VxD) of the first stage of initialization. Upon reception of Sys_Critical_Init, the power-saving driver performs its internal initialization processing.

After the OS itself has almost been started, the OS notifies the power-saving driver of the OS start completion message (Sys_VM_Init) (step A11).

In response to the OS start completion message (Sys_VM_Init), the power-saving driver reads a timer value from the registry area of the HDD 161 (step A12), and sets a callback with respect to the OS so as to issue a call from the OS after a predetermined time designated by the timer value (step A13). The timer value used for callback setting is a time enough to complete the remaining OS processing, and start processing of various system control programs and application programs. Further, the timer value is a time as short as not to unnecessarily increase power consumption.

The OS subsequently performs processing. After the lapse of a time designated by the timer value, the OS calls the power-saving driver. At this time, the power-saving driver controls hardware via the BIOS or directly, thereby setting the processing speed of the CPU 11 to a user-designated processing speed set in the HDD 161 (step A14). Then, the processing speed of the CPU 11 is switched from its default processing speed (highest speed) to the user-designated one. During the user job period, the CPU 11 operates at the user-designated processing speed.

At the end of the system, the OS notifies the power-saving driver of an OS termination start message (Sys_VM_Terminal) representing the start of shutdown processing (step A15).

In response to this, the power-saving driver controls hardware via the BIOS or directly, thereby resetting the processing speed of the CPU 11 to its default processing speed (highest speed) (step A16). Then, shutdown processing is executed at a high speed regardless of the user-designated speed.

Figure 7:
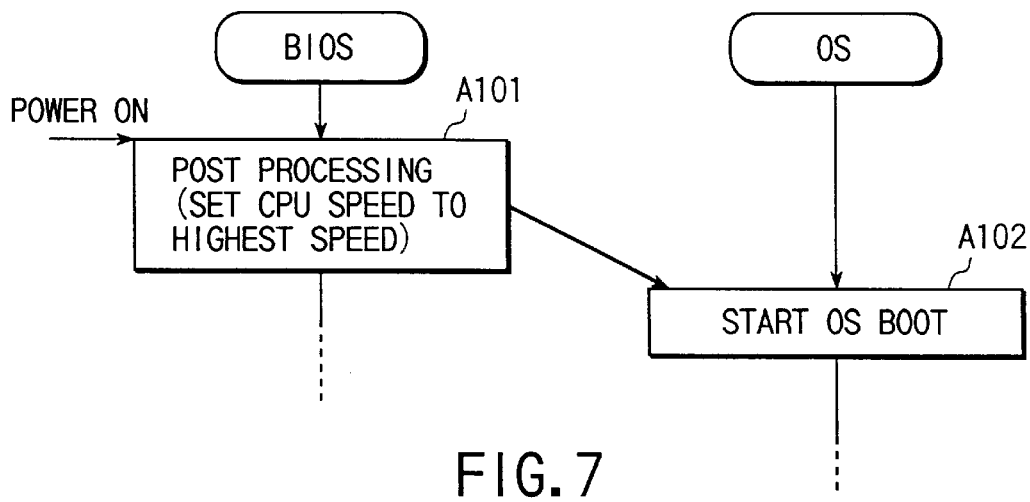
FIG. 7 is a flow chart showing processing procedures when the CPU processing speed in start processing is set to the highest speed by a BIOS used in the system of the first embodiment.

The above processing assumes that the CPU 11 operates at its default processing speed so long as the power-saving driver does not control the CPU speed. In system start processing, the BIOS performs POST processing prior to OS start processing, as described above. In this POST processing, the BIOS may set the CPU speed to the highest one. The processing flow in this case is shown in FIG. 7.

More specifically, if a system start event (power-on operation, reset, restart, and the like) occurs, POST processing is first executed, as described above (step A101). In this POST processing, hardware check and initialization processing are done. At this stage, the BIOS controls the CPU speed control circuit 152 to set the processing speed of the CPU 11 to the highest one.

The BIOS executes an IPL on the MBR of the HDD 161, and the IPL starts the boot loader of the OS to start OS boot processing (OS bootstrap sequence) (step A102). In OS boot processing, load of a kernel, load of various drivers, and the like are sequentially executed in a predetermined order, as described above.

<Suspend/Resume Processing>

Figure 8:
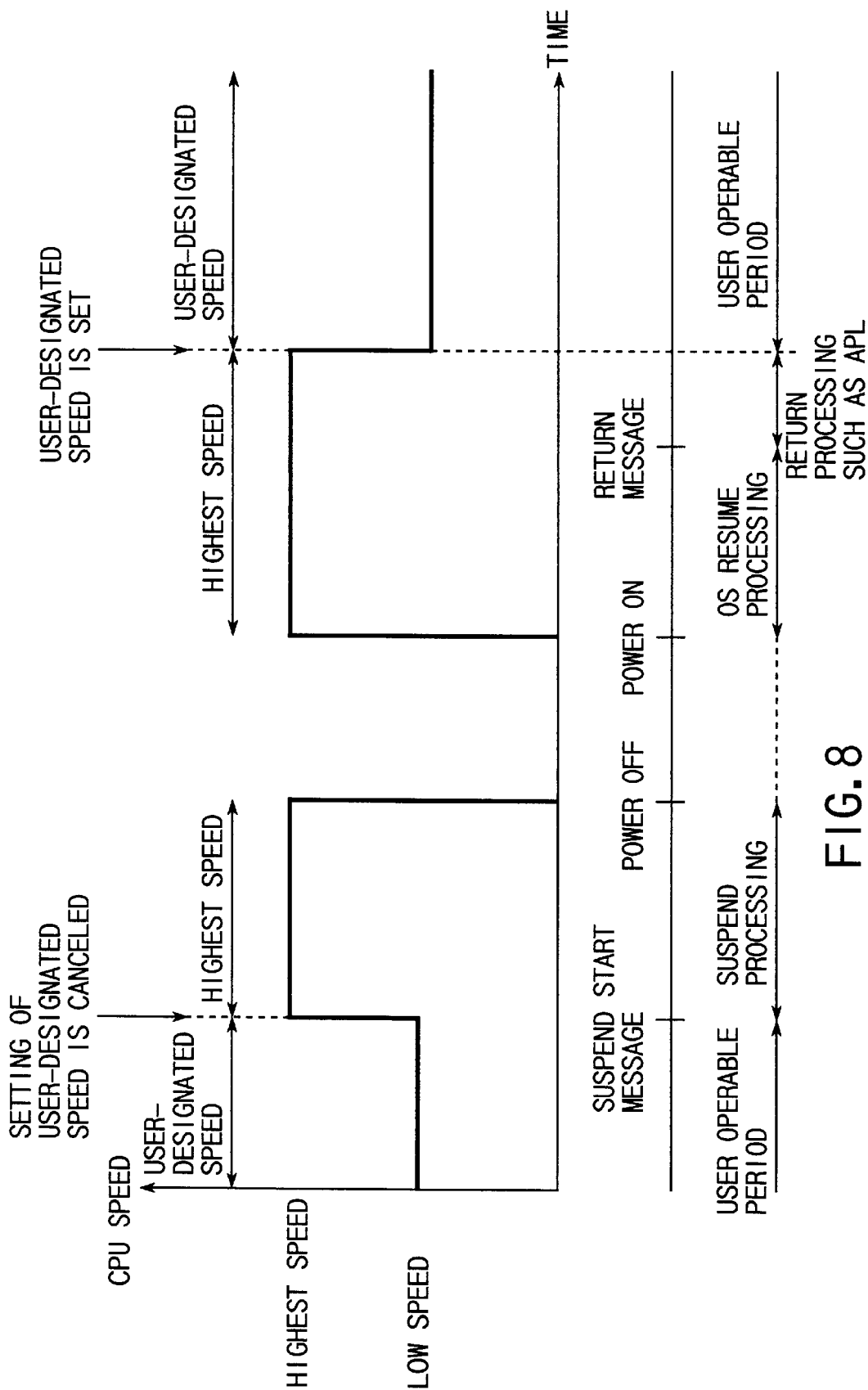
FIG. 8 is a view for explaining the principle of system control method in suspend/resume processing in the system of the first embodiment.

The system control method of the first embodiment can be executed not only in start processing and termination processing, but also in suspend and resume. This operation principle will be described with reference to FIG. 8.

Suspend is processing of suspending the current operation of the computer system and setting a standby state (in some cases, completely powering off the system). In suspend processing, information such as a system status necessary for restoring the current operation state is saved in the main memory 13 or HDD 161, and then processing of stopping system operation is performed.

When information is saved in the main memory 13, almost all devices except for the main memory 13 are powered off. When information is saved in the HDD 161, the contents of the main memory 13 are also saved in the HDD 161, and thus all devices including the main memory 13 can be powered off.

This suspend processing is executed by the OS or in cooperation with the OS and BIOS. If the user operates the suspend button or power-off switch, suspend processing starts. At the start of suspend processing, a message representing the start of suspend processing is issued. In Windows 95/98, the message is APM_SUSPEND.

Immediately after the power-saving driver detects the start of suspend processing based on APM_SUSPEND, the driver cancels setting of the user-designated speed, and returns the CPU 11 to its default processing speed. Subsequent suspend processing is executed at the default processing speed (highest speed in the first embodiment) regardless of the user-designated speed. Hence, suspend processing can be executed at a high speed regardless of the set value of the user-designated speed.

When the system is powered off by suspend processing, the user performs power-on operation to execute resume processing. Resume processing executes processing of restoring information saved in suspend processing to an original location, restoration processing of each software, and resetting processing of each device. Accordingly, the operation state immediately before the start of suspend processing is restored. This resume processing is executed by the OS or in cooperation with the OS and BIOS.

After return processing of the OS, driver, and the like is done to almost complete resume processing, the OS issues a return message representing completion of resume processing (return from suspend). If the power-saving driver detects from the return message that OS start processing has almost been completed, the driver waits for the lapse of a predetermined period necessary for enabling the user operating the computer system. Then, the power-saving driver sets the processing speed of the CPU 11 to the user-designated one.

The power-saving driver waits for the lapse of a predetermined period upon completion of OS return processing because of the following reason. In resume processing of the computer system, software return processing of application programs and the like, and device resetting processing are generally done upon completion of OS return processing. Thus, user operation is not enabled immediately upon completion of OS return processing. A time (timer value #2) necessary for enabling user operation is determined using a measurement value, similar to the timer value in system start processing. The timer value #2 is recorded on the HDD 161 as one of pieces of setting information (registry) managed by the OS.

Under this control, the system can be operated at a high speed regardless of the user-designated speed even during suspend/resume processing.

<Control Flow in Suspend/Resume>

Figure 9:
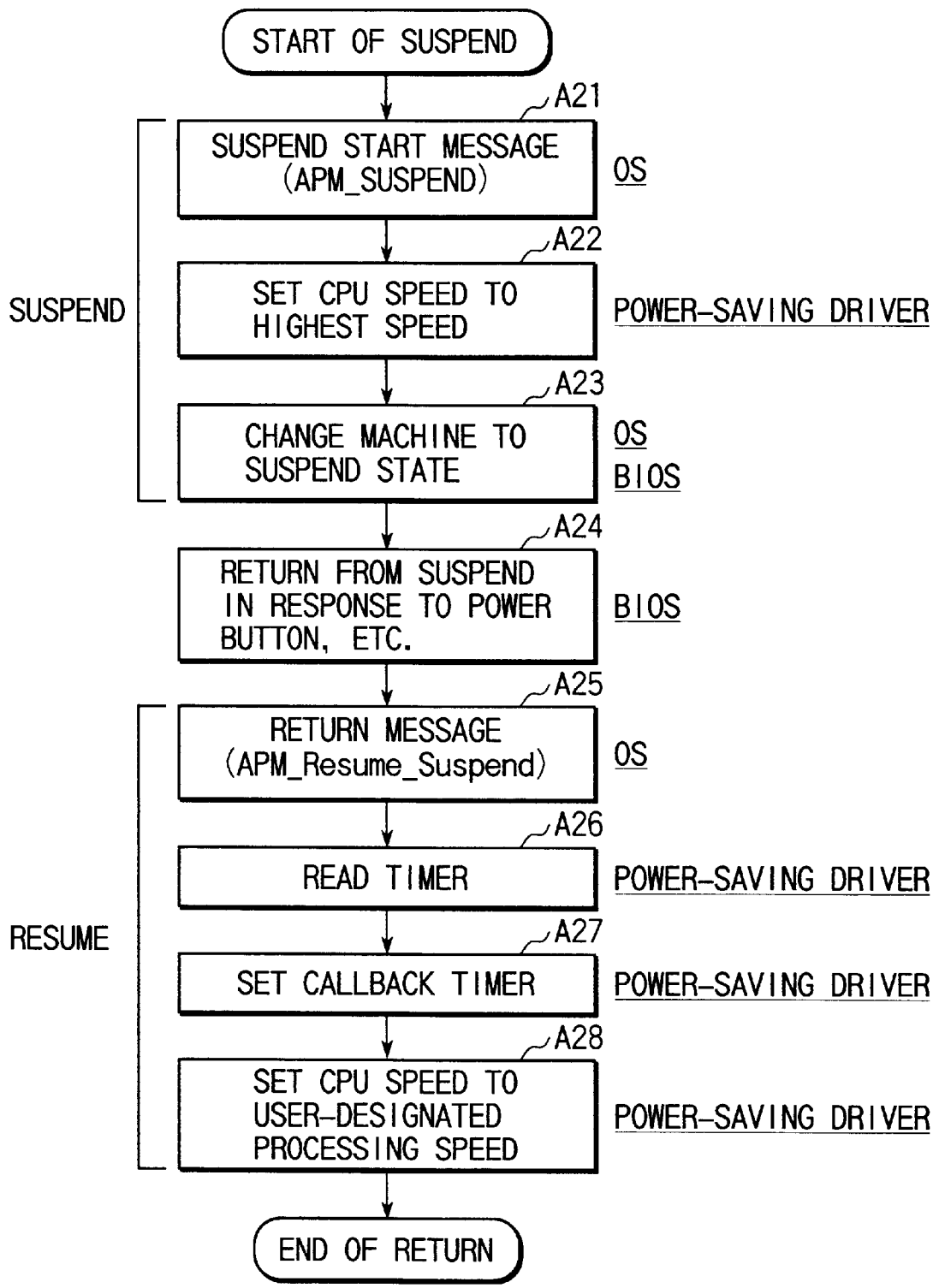
FIG. 9 is a flow chart showing the flow of a series of control operations executed in suspend/resume in the system of the first embodiment.
Figure 10:
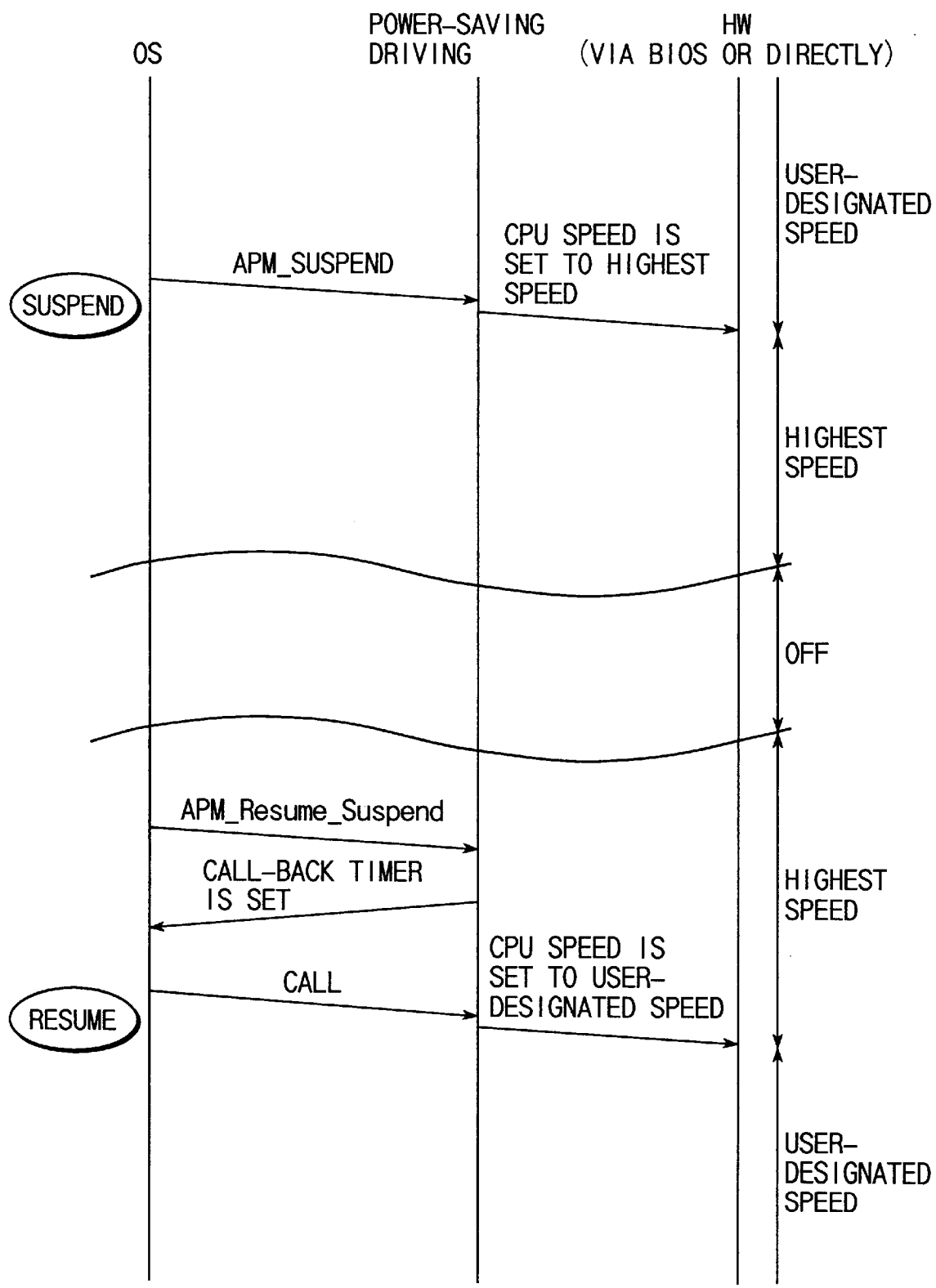
FIG. 10 is a view showing a processing sequence when attention is given to exchange of messages between the OS and power-saving driver used in the first embodiment.

The procedures of the system control method executed in suspend/resume will be explained with reference to FIGS. 9 and 10. FIG. 9 is a flow chart showing the flow of a series of control operations executed in suspend/resume. FIG. 10 is a view showing a processing sequence when attention is given to exchange of messages between the OS and the power-saving driver.

In suspend processing, the OS notifies the power-saving driver of a suspend start message (APM_SUSPEND) representing the start of suspend processing (step A21).

In response to this, the power-saving driver controls hardware via the BIOS or directly, thereby resetting the processing speed of the CPU 11 to its default processing speed (highest speed) (step A22).

Then, suspend processing is executed at a high speed regardless of the user-designated speed, and the computer system changes to the suspend state (step A23).

If the user performs power-on operation, system status return processing is done under the control of the BIOS, and OS return processing starts (step A24).

After return processing of the OS itself has almost been completed, the OS notifies the power-saving driver of a return message (APM_Resuem_Suspend), as described above (step A25).

In response to this return message (APM_Resuem_Suspend), the power-saving driver reads the timer value #2 from the registry area of the HDD 161 (step A26), and sets a callback with respect to the OS so as to issue a call from the OS after a predetermined time designated by the timer value #2 (step A27). The timer value used by callback setting is a time enough to complete the remaining OS processing, and return processing of application programs and the like. Further, the timer value is a time as short as not to unnecessarily increase power consumption.

The OS subsequently performs processing. After the lapse of a time designated by the timer value #2, the OS calls the power-saving driver. At this time, the power-saving driver controls hardware via the BIOS or directly, thereby setting the processing speed of the CPU 11 to the user-designated processing speed set in the HDD 161 (step A28). Then, the processing speed of the CPU 11 is switched from its default processing speed (highest speed) to the user-designated one. During the user job period, the CPU 11 operates at the user-designated processing speed.

In the first embodiment, only the processing speed of the CPU 11 is variably set. In addition to control of the processing speed of the CPU 11, or instead of it, variable setting of the bus clock, switching of use/non-use of the cache, or variable setting of the memory band width can be performed to change the processing speed of the system.

The first embodiment has exemplified a specific OS so as to detect a message from the OS. So long as the message has the same meaning, another message other than the message described in this embodiment can be used as a trigger to detect completion of OS start processing, completion of OS resume processing, and the like. Also in this case, the final detectable message among a plurality of messages generated in accordance with the stage of OS start processing is most preferably used because this can minimize the shift amount between the timer value and a time until user operation is enabled after a message is issued. Even a message generated at another timing can be used by setting an optimal timer value in accordance with the timing of the message.

The user-designated processing speed need not always explicitly designate a processing speed such as a high, middle, or low speed. Alternatively, the processing speed may be low in battery operation, and may be high in operation by an external power supply connected via the AC adapter, as described above.

According to the invention described in the first embodiment, the system can be operated at the user-designated processing speed only during the user job period. During system start processing/shutdown processing, the system can be operated at a predetermined arbitrary processing speed regardless of the user-designated processing speed. This can improve the operability while maintaining low power consumption.

Next, the arrangement related to the second embodiment will be described below.

In the second embodiment, when the CPU temperature drops to a safe temperature or the AC adapter is connected, the PCI-ISA bridge 15 notifies the system BIOS by an SMI that the CPU speed-up event has occurred. In this case, processing of increasing the CPU speed is done under the control of the system BIOS, operating system, or the like.

The above-described POST routine includes the function of setting the CPU speed to the highest one using the CPU speed control circuit 152, in addition to normal hardware check and initialization routines.

The CPU speed can also be designated not only by the BIOS setup routine, but also by a power-saving utility that runs under the running environment of the operating system, or predetermined key input operation (hot key) by the user.

<Principle of System Control Method in Second Embodiment>

The principle of system control method used in the second embodiment of the present invention will be explained with reference to FIG. 11.

Figure 11:
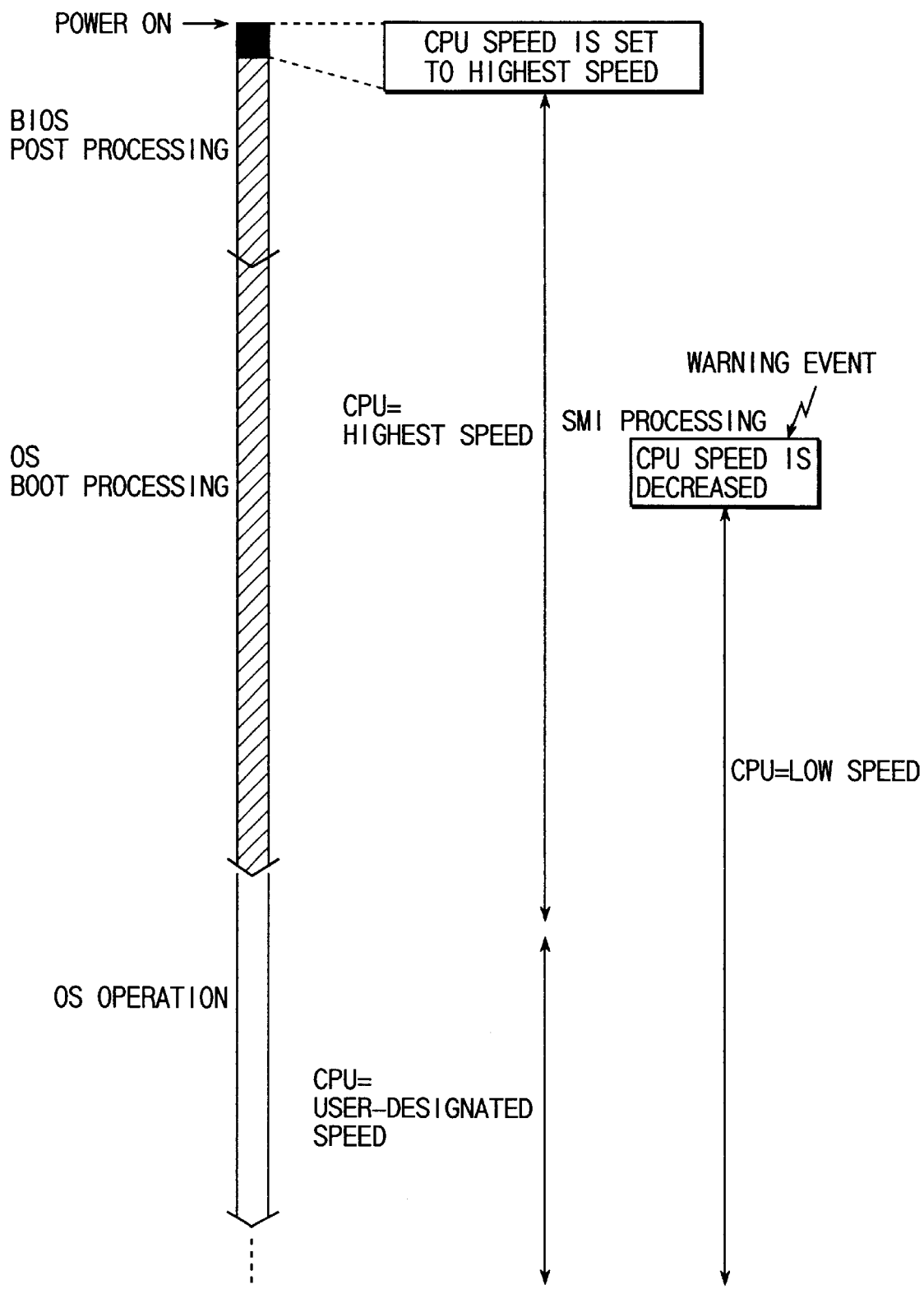
FIG. 11 is a view for explaining the principle of system control method used in the second embodiment of the present invention.

As shown in FIG. 11, system start processing is made up of POST processing of the system BIOS, and subsequently executed OS boot processing.

If a system start event (power-on operation, reset, restart, or the like) occurs, POST processing is first executed. In this POST processing, hardware check and initialization processing are done. At this stage, the CPU speed control circuit 152 is controlled to set the CPU speed to the highest one (full power). The system BIOS executes an IPL on the MBR of the HDD 161, and the IPL starts the boot loader of the OS to start OS boot processing (OS bootstrap sequence).

In OS boot processing, load of a kernel, load of various drivers/utilities which must be assembled in the kernel, and the like are sequentially executed in a predetermined order. In general, drivers which directly control device operation are first loaded, and then drivers which do not directly concern device operation are loaded closer to the end of OS boot processing. For OS/drivers which directly operate a device, processing for setting the above-mentioned software loop counter is performed in load. The CPU 11 operates at the highest CPU speed till the end of OS boot processing.

After OS boot processing ends, processing of returning the CPU speed to a user-designated CPU speed stored in the CMOS memory 20 is done under the control of the system BIOS. Then, the CPU 11 operates at the user-designated speed.

In the second embodiment, the CPU 11 operates at the highest CPU speed till the end of OS boot processing regardless of the user-designated speed or another predetermined factor. This prevents the CPU speed from increasing during OS boot processing even upon occurrence of a CPU speed switching event. For this reason, even when the software loop counter is used by the OS or driver, a wait time equal to or longer than a wait time defined by a device can always be obtained. The device normally operates as far as a wait time equal to or longer than the wait time necessary for this device is ensured. Accordingly, the reliability of system operation can be improved, and the speed of system start processing can be increased.

When a warning event occurs due to temperature rise or the like during OS boot processing, processing of forcibly decreasing the CPU speed is executed by SMI processing of the system BIOS. In this case, the CPU speed variably-setting function of maintaining the highest CPU speed until the OS is booted fails. Subsequently, execution of CPU speed switching processing for increasing the CPU speed is inhibited. As a result, normal operation of an OS or driver using the software loop counter can be assured.

<Software Loop Counter Setting Processing>

Figure 12:
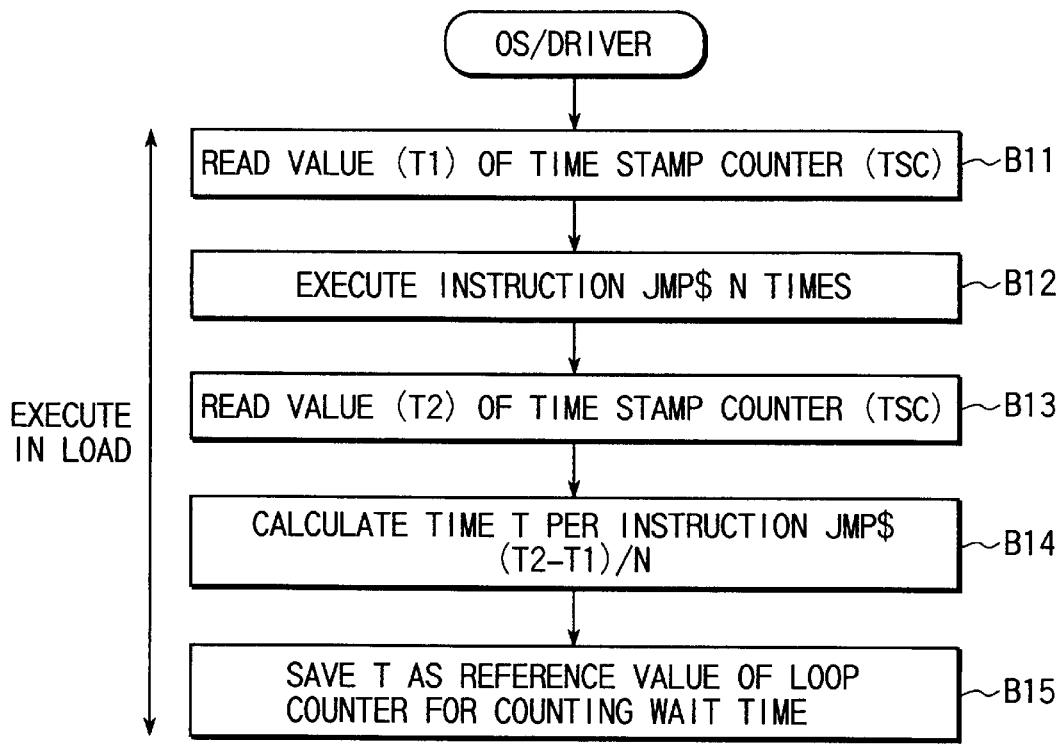
FIG. 12 is a flow chart showing an example of software loop counter setting processing executed by an OS or driver used in the second embodiment in loading the OS or drive

Software loop counter setting processing executed by the OS or driver in load will be described with reference to FIG. 12.

The OS or driver reads the current value (T1) of a time stamp counter (TSC) in the CPU 11 (step B11), and repetitively executes a specific instruction, e.g., jump instruction (JMP$) N times (step B12). After execution, the OS or driver reads again the current value (T2) of the time stamp counter (TSC) in the CPU 11 (step B13).

The OS or driver calculates a predetermined time T (T=(T2−T1)/N) per instruction from the time spent for N jump instructions (step B14), and saves the calculated time T in the memory as a reference value for counting the wait time (step B15).

<Procedure 1 of System Control Method>

Figure 13:
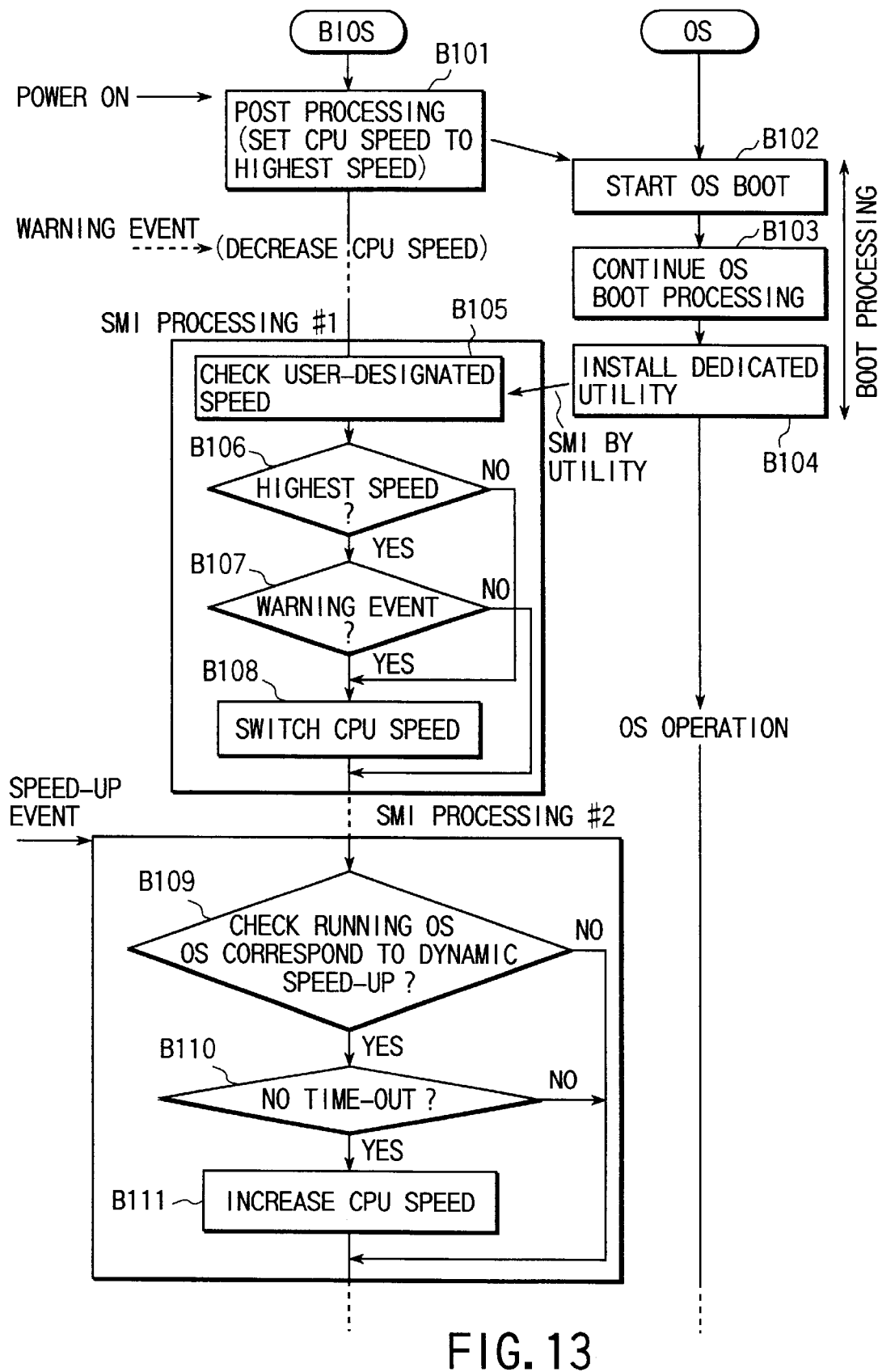
FIG. 13 is a flow chart showing the first example for implementing the system control method of the second embodiment

FIG. 13 shows the first example for implementing the system control method. In this example, whether OS boot processing ends is determined when a dedicated utility notifies the system BIOS of the end of installing the dedicated utility (or driver) to be assembled in the OS for use.

An example of the dedicated utility is a power-saving utility for providing the user with the CPU speed switching function. An interface with the system BIOS is prepared for the power-saving utility. When the power-saving utility is loaded, this is notified to the system BIOS. The power-saving utility is empirically known to be loaded close to the end of OS boot processing.

If a system start event (power-on operation, reset, restart, or the like) occurs, the POST processing routine of the system BIOS performs hardware check and initialization processing. At this time, the speed of the CPU 11 is set to the highest speed using the CPU speed control circuit 152 (step B101).

After POST processing ends, OS boot processing (OS bootstrap sequence) starts (step B102). While load of a kernel, load of various drivers/utilities which must be assembled in the kernel, and the like are sequentially performed, OS boot processing progresses (step B103).

If the OS loads (installs) the power-saving utility during OS boot processing (step B104), the power-saving utility generates a software SMI using the SMI generation circuit 151.

This software SMI calls an SMI processing routine (#1) of the system BIOS. At this time, the system BIOS determines the end of OS boot processing.

The SMI processing routine (#1) refers to the CMOS memory 20 to check the user-designated CPU speed, and determines whether the highest speed is designated (steps B105 and B106).

If NO in step B106, the SMI processing routine (#1) switches the speed of the CPU 11 to the user-designated speed using the CPU speed control circuit 152 (step B108). After that, the CPU 11 operates at the user-designated speed.

If YES in step B106, the SMI processing routine (#1) does not perform CPU speed switching processing in step B108 because the current CPU speed has already been highest. However, if a warning event occurs (YES in step B107), the SMI processing routine (#1) executes CPU speed switching processing in step B108 in order to decrease the CPU speed to a safe speed. Note that the warning event may occur before OS boot processing ends, i.e., a notification from the power-saving utility arrives. Processing in this case will be described below with reference to FIG. 18.

After the SMI processing routine (#1) ends, the control returns to the OS. When, for example, the user instructs to increase the current user-designated speed (low power) to full power with a hot key during OS operation, or when the CPU temperature drops to a safe temperature or the AC adapter is connected upon occurrence of a warning event, a speed-up event occurs.

In this case, an SMI processing routine (#2) of the system BIOS is called by an SMI from the SMI generation circuit 151. The SMI processing routine (#2) checks a running operating system to determine whether the OS corresponds to dynamic CPU speed-up processing (step B109).

If NO in step B109, the flow skips steps B110 and B111 to inhibit CPU speed-up processing. If YES in step B109, whether time-out does not occur is checked (step B110).

"Time-out" means that the CPU speed cannot be maintained at the highest speed till the end of OS boot processing owing to occurrence of a warning event before OS boot processing ends, i.e., a notification from the power-saving utility arrives.

If time-out is not determined, i.e., the CPU speed can be maintained at the highest speed till the end of OS boot processing (YES in step B110), the SMI processing routine (#2) increases the speed of the CPU 11 using the CPU speed control circuit 152 because the CPU speed does not exceed a CPU speed during OS boot processing even if the CPU speed is increased (step B111).

If time-out is determined (NO in step B110), the CPU speed may exceed a CPU speed during OS boot processing, and execution of processing in step B111 is inhibited.

<Procedure 2 of System Control Method>

Figure 14:
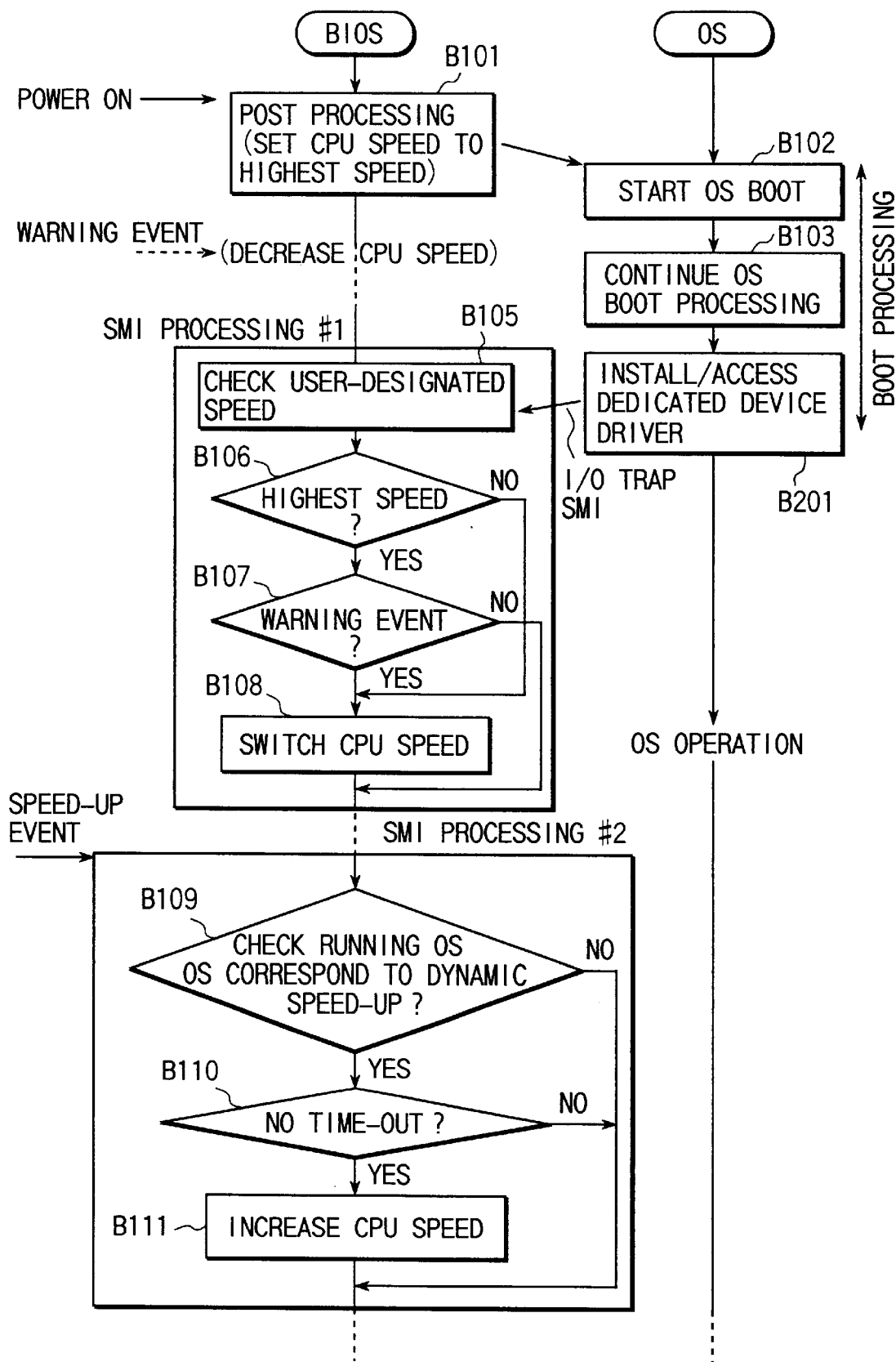
FIG. 14 is a flow chart showing the second example for implementing the system control method of the second embodiment.

FIG. 14 shows the second example for implementing the system control method. This method is effective when an error may occur in a specific device at high possibility. Processing of installing (loading) the driver of the device and actually running the driver is defined as OS boot processing.

The specific driver includes a driver, e.g., a SCSI driver which is empirically known to generate an error at high possibility if the CPU speed during actual OS operation is higher than that during boot processing. Different SCSI drivers must be used for different SCSI devices, so an interface with the system BIOS is difficult to prepare, unlike the power-saving utility. For this reason, the second example sets the SMI generation circuit 151 so as to generate an I/O trap SMI when the SCSI driver accesses a SCSI device. When the I/O trap SMI is generated, OS boot processing is determined to end.

More specifically, if a system start event (power-on operation, reset, restart, or the like) occurs, the POST processing routine of the system BIOS performs hardware check and initialization processing. At this time, the speed of the CPU 11 is set to the highest speed using the CPU speed control circuit 152 (step B101).

After POST processing ends, OS boot processing (OS bootstrap sequence) starts (step B102). While load of a kernel, load of various drivers/utilities which must be assembled in the kernel, and the like are sequentially performed, OS boot processing progresses (step B103).

During OS boot processing, the OS loads (installs) the SCSI driver. If the SCSI driver actually accesses a device (step B201), the SMI generation circuit 151 generates an I/O trap SMI. This software SMI calls the SMI processing routine (#1) of the system BIOS. The subsequent processing is the same as in FIG. 13.

In this manner, processing of installing (loading) a driver which readily causes an error, and actually running the driver is defined as OS boot processing. Even if the CPU speed is switched to user-designated low power before OS boot processing does not completely end, normal operation can be ensured at high probability.

<Procedure 3 of System Control Method>

Figure 15:
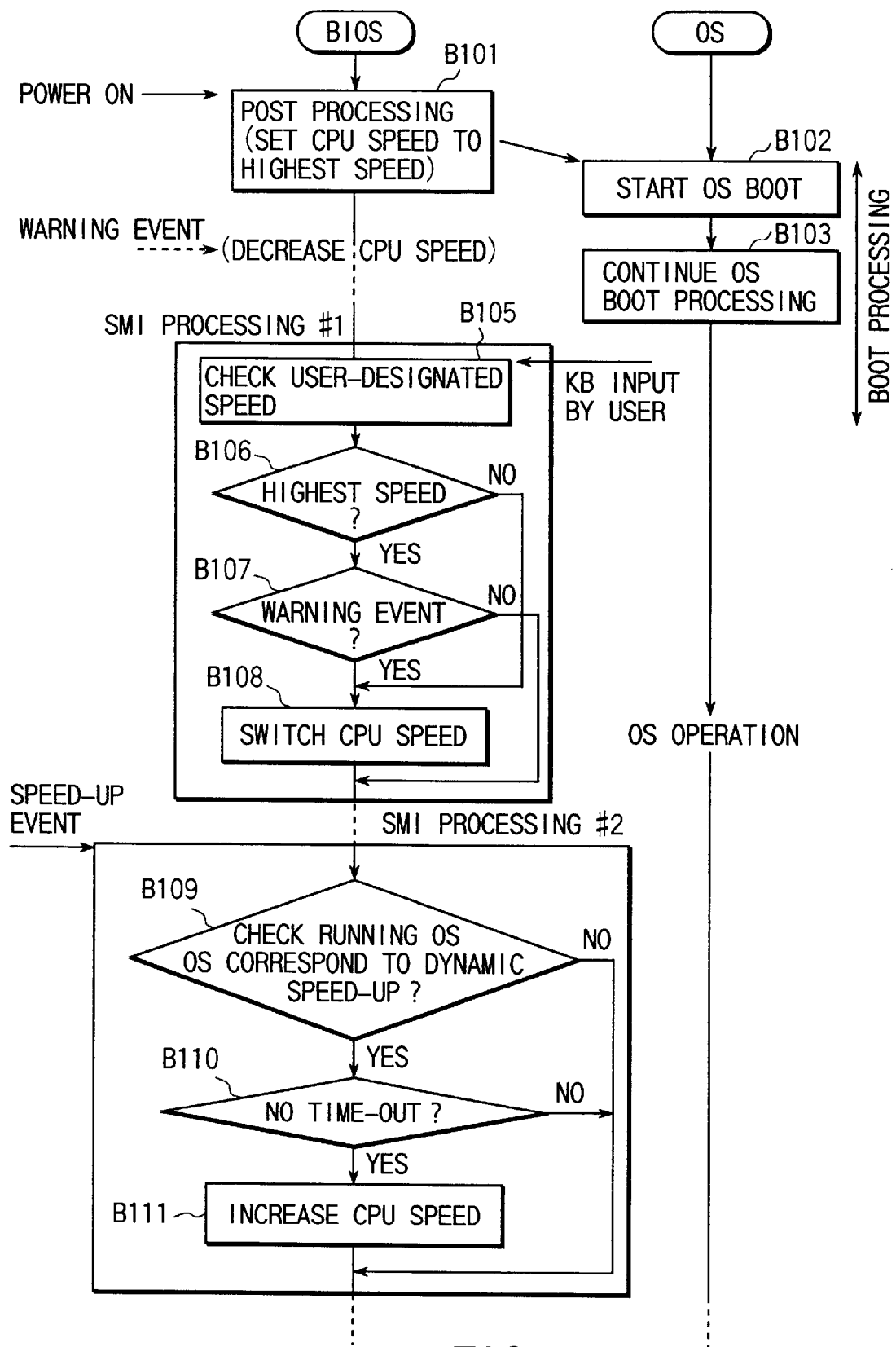
FIG. 15 is a flow chart showing the third example for implementing the system control method of the third embodiment.

FIG. 15 shows the third example for implementing the system control method. This example is the same as in FIG. 13 except that whether OS boot processing ends is determined based on specific key input from the user.

The user can know the end of OS boot processing on the display. If the user knows in advance a key or a combination of keys the user should press at the end of OS boot processing, whether OS boot processing ends can be correctly determined. By assigning, as a hot key, a key or a combination of keys the user should press at the end of OS boot processing, the SMI generation circuit 151 generates an SMI in operating the key. This SMI calls the SMI processing routine (#1) of the system BIOS.

Alternatively, whether OS boot processing ends may be determined using a key or a combination of keys the user does not press during OS boot processing, e.g., the user does not use to input a password or login name. Various specific input events such as mouse operation from the user may be used instead of key input.

<Procedure 4 of System Control Method>

Figure 16:
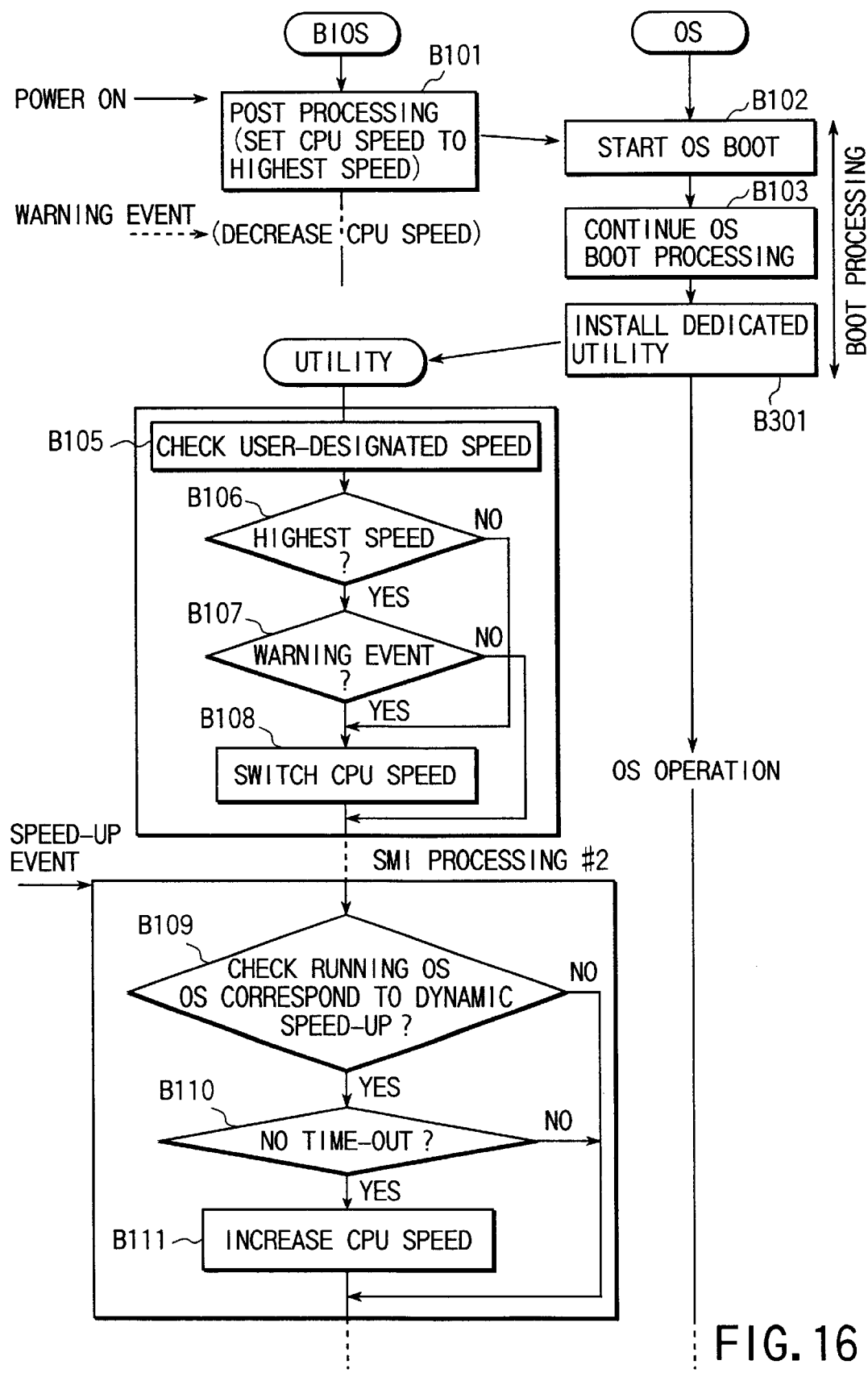
FIG. 16 is a low chart showing the fourth example for implementing the system control method of the fourth embodiment.

FIG. 16 shows the fourth example for implementing the system control method. In the fourth example, similar to the first example, OS boot processing is determined to end when a dedicated utility (driver) such as the power-saving utility is installed. In addition, not the SMI processing routine of the system BIOS, but the loaded dedicated utility performs processing of switching the CPU speed to the user-designated speed.

That is, if a system start event (power-on operation, reset, restart, or the like) occurs, the POST processing routine of the system BIOS performs hardware check and initialization processing. At this time, the speed of the CPU 11 is set to the highest speed using the CPU speed control circuit 152 (step B101).

After POST processing ends, OS boot processing (OS bootstrap sequence) starts (step B102). While load of a kernel, load of various drivers/utilities which must be assembled in the kernel, and the like are sequentially performed, OS boot processing progresses (step B103).

If the OS loads (installs) the power-saving utility during OS boot processing (step B301), the power-saving utility determines that OS boot processing ends, and executes the same processing as the SMI processing routine (#1) (steps B105 to B108).

Also, when a speed-up event occurs, the power-saving utility may perform processes in steps B109 and B110, in place of the SMI processing routine (#2).

<Procedure 5 of System Control Method>

Figure 17:
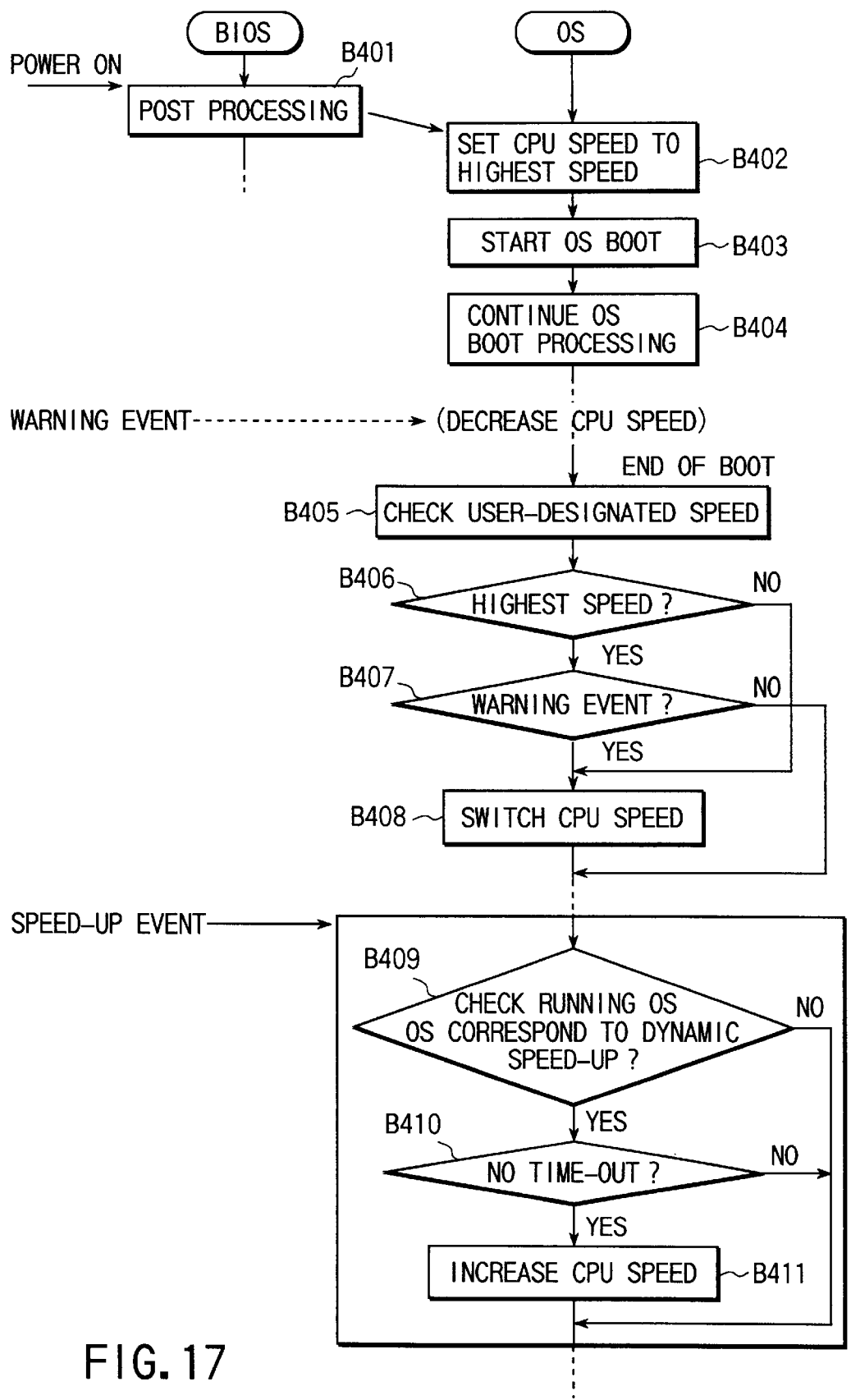
FIG. 17 is a flow chart showing the fifth example for implementing the system control method of the fifth embodiment.

FIG. 17 shows the fifth example for implementing the system control method. In the fifth example, all processing for controlling the CPU speed is executed by the operating system.

If a system start event (power-on operation, reset, restart, or the like) occurs, the POST processing routine of the system BIOS performs hardware check and initialization processing (step B401).

After POST processing ends, OS boot processing (OS bootstrap sequence) starts (step B402). While load of a kernel, load of various drivers/utilities which must be assembled in the kernel, and the like are sequentially performed, OS boot processing progresses (step B403).

After OS boot processing ends, the OS refers to the CMOS memory 20 to check the user-designated CPU speed, and determines whether the highest speed is designated (steps B405 and B406).

If NO in step B406, the OS switches the speed of the CPU 11 to the user-designated speed using the CPU speed control circuit 152 (step B408). Then, the CPU 11 operates at the user-designated speed.

If YES in step B406, the OS does not perform CPU speed switching processing in step B408 because the current CPU speed has already been highest. However, if a warning event occurs (YES in step B407), the OS executes CPU speed switching processing in step B408 in order to decrease the CPU speed to a safe speed. Note that the warning event may occur before OS boot processing ends. Processing in this case will be described below with reference to FIG. 18.

When, for example, the user instructs to increase the current user-designated speed (low power) to full power with a hot key during OS operation, or when the CPU temperature drops to a safe temperature or the AC adapter is connected upon occurrence of a warning event, a speed-up event occurs. Processing for the speed-up event may be performed by the OS. In this case, the OS checks whether the OS itself corresponds to CPU speed-up processing (step B409).

If NO in step B409, the flow skips steps B410 and B411 to inhibit CPU speed-up processing. If YES in step B409, whether time-out does not occur is checked (step B410).

If time-out is not determined, i.e., the CPU speed can be maintained at the highest speed till the end of OS boot processing (YES in step B410), the OS increases the speed of the CPU 11 using the CPU speed control circuit 152 because the CPU speed does not exceed a CPU speed during OS boot processing even if the CPU speed is increased (step B411).

If time-out is determined (NO in step B410), the CPU speed may exceed a CPU speed during OS boot processing, and execution of processing in step B411 is inhibited.

In this system control method, the CPU speed is set to the user-designated speed during POST processing, and operates at the highest speed only during OS boot processing. To even slightly increase the system start speed, processing of setting the CPU speed to the highest speed is done during POST processing.

<Warning Event SMI Processing>

Figure 18:
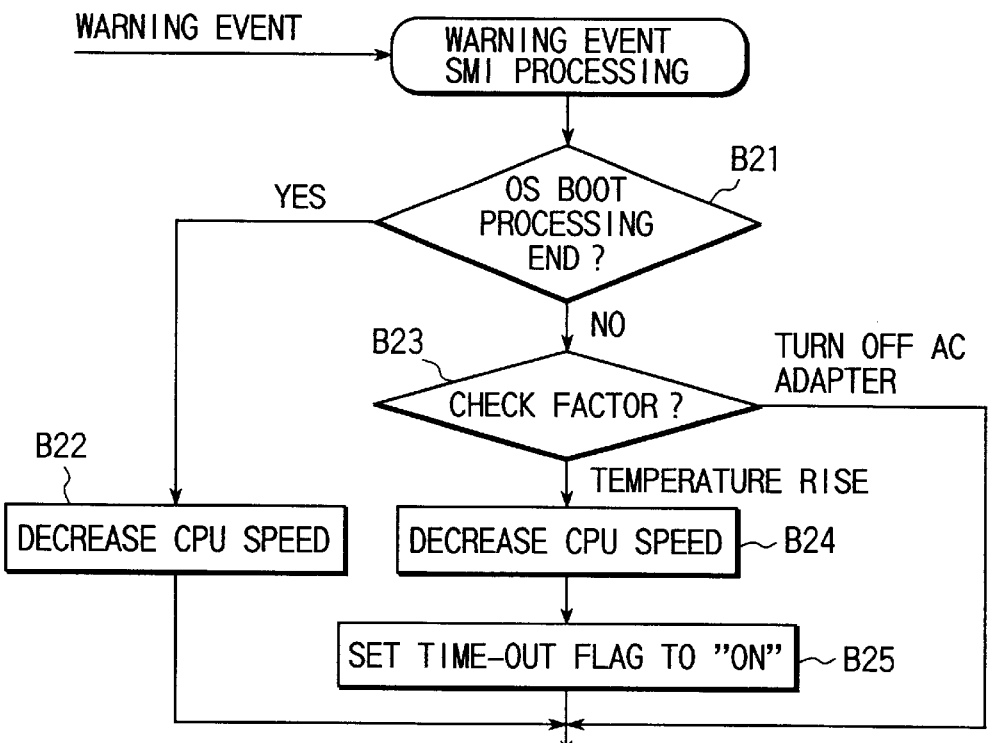
FIG. 18 is a flow chart showing the procedures of warning event SMI processing used in the second embodiment.

FIG. 18 shows processing procedures executed by the system BIOS (or OS) upon occurrence of a warning event. In either the system BIOS or the OS, the contents of processing for a warning event are the same. In the following description, processing by the SMI processing routine of the system BIOS for a warning event will be exemplified.

Upon occurrence of a warning event, SMI processing (warning event SMI processing) of the system BIOS is executed. This SMI processing routine determines using any one of the above examples whether OS boot processing ends (step B21).

If YES in step B21, the SMI processing routine executes processing of unconditionally decreasing the CPU speed (step B22).

If NO in step B21, i.e., a warning event occurs during OS boot processing, the SMI processing routine refers to a factor register in the SMI generation circuit 151 to check whether the warning event is caused by temperature rise of the CPU or disconnection of the AC adapter 181 (power-off operation of the AC adapter) (step B23).

If the warning event is caused by temperature rise, the SMI processing routine decreases the CPU speed using the CPU speed control circuit 152 because a serious system error may occur at the current CPU speed (B24). Then, the SMI processing routine sets a time-out flag representing occurrence of time-out to "ON" (step B25). This time-out flag can be used when an SMI processing routine executed in response to a speed-up event determines whether time-out does not occur.

If the warning event is caused by power-off operation of the AC adapter, the SMI processing routine does not perform CPU speed-down processing in step B24 so as to allow maintaining the CPU speed at the highest speed until OS boot processing ends. In this case, an SMI processing routine executed at the end of OS boot processing performs CPU speed-down processing.

<Control of Shutdown Processing>

Figure 19:
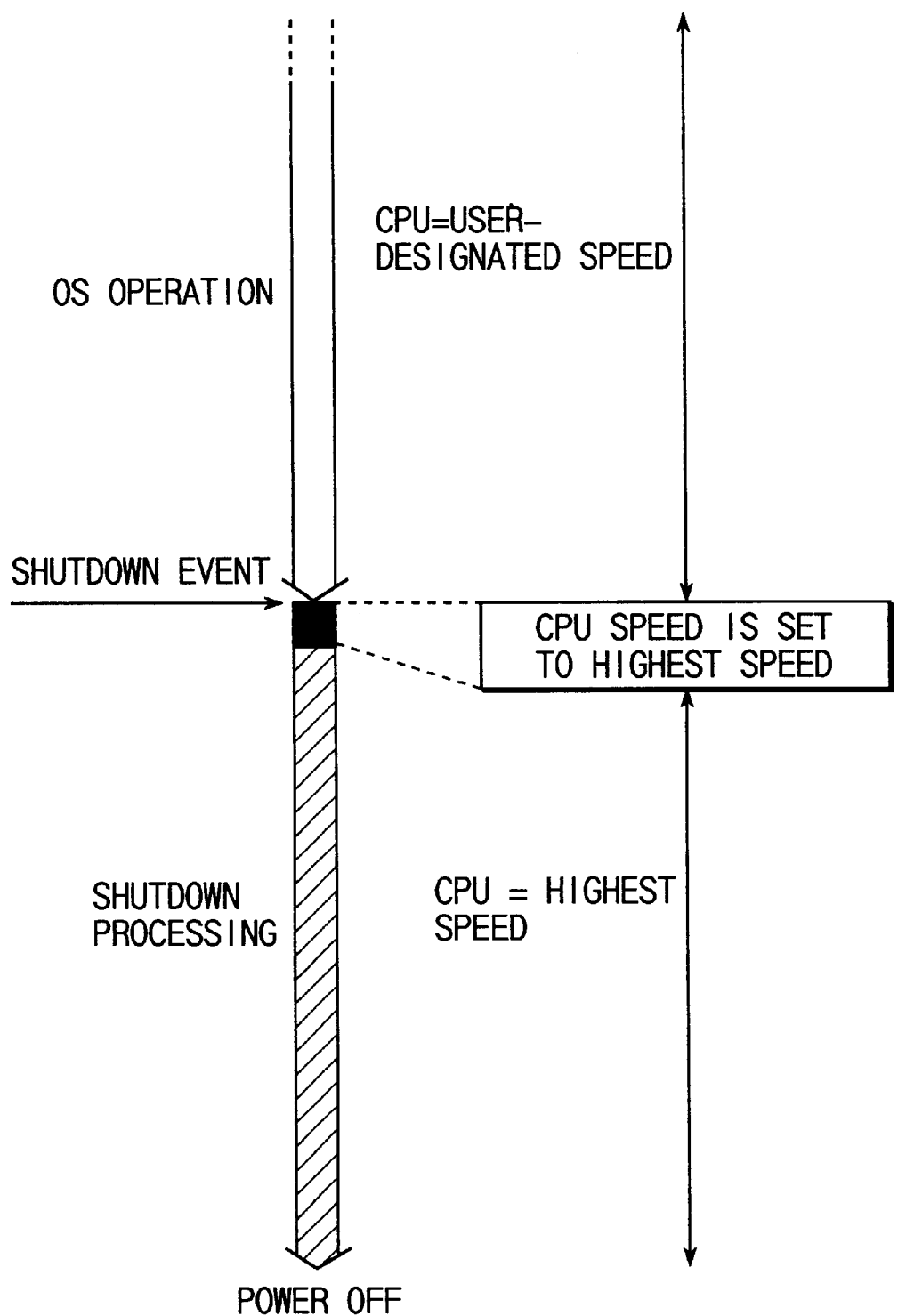
FIG. 19 a view showing CPU speed control during shutdown processing in the second embodiment.

CPU speed control executed during shutdown/standby processing will be explained with reference to FIG. 19.

If an event (power-off operation, input of shutdown command, reset, or the like) for causing the computer system to shut down/stand by occurs, the system BIOS and OS cooperate with each other to execute the shutdown sequence (or standby sequence) of the OS and subsequently the power-off sequence of the system BIOS. At the start of shutdown/standby processing, the system BIOS or OS sets the CPU speed to the highest speed using the CPU speed control circuit 152. Then, the CPU 11 operates at the highest speed until the system is actually powered off.

Not only during system start processing or shutdown processing, but also during suspend/hibernation processing for setting the system to a sleep state, the CPU 11 can be operated at the highest speed.

In the second embodiment, the CPU 11 is operated at the highest speed till the end of OS boot processing regardless of user's designation or another predetermined factor. This can improve the reliability of system operation and can increase the speed of system start processing. When the end of OS boot processing is detected, the speed of the CPU 11 can be returned to the user-designated CPU speed to implement low power consumption of the computer system. If the CPU speed cannot be maintained at the highest speed till the end of OS boot processing due to occurrence of a warning event, execution of subsequent CPU speed switching processing for increasing the CPU speed is inhibited, so that the reliability of system operation can be maintained.

For an OS ensured not to generate any error even if the CPU speed increases after boot, the CPU speed may be returned to the original user-designated CPU speed after this OS is determined to be an OS which started boot processing. Alternatively, the type of OS may be determined by POST processing, and for an OS ensured not to generate any error, even if the CPU speed increases after boot, the CPU may be operated at the original user-designated CPU speed. For another OS, the CPU may be operated at the highest speed till the end of boot.

According to the invention described in the second embodiment, the CPU is operated at the highest speed till the end of system start processing regardless of user's designation or another predetermined factor. This can improve the operation reliability of a system capable of switching the CPU speed and can increase the speed of system start processing.

As has been described in detail above, the present invention can provide a computer system for implementing high-speed start processing or the like, and a CPU speed control method therefor. Further, the present invention can provide a computer system for improving the reliability of system operation, and a CPU speed control method therefor.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system comprising:
    a processor;
    means for designating a user to designate a processing speed of the processor;
    means for controlling the processing speed of the processor; and
    means for setting the processing speed by the means for controlling, setting the processing speed to a highest speed during a period for start processing for the computer system, regardless of whether or not the user-designated speed is set.

2. The system according to claim 1, wherein the means for setting sets the processing speed of the processor to the user-designated speed after a lapse of a predetermined period until user operation to the computer system is enabled upon completion of the start processing.

3. The system according to claim 2, wherein the means for setting waits for the lapse of the predetermined period from a time when a predetermined message is issued during the start processing of the operating system.

4. The system according to claim 2, wherein the means for setting waits for the lapse of the predetermined period from a time when the start processing is completed.

5. The system according to claim 1, wherein the means for setting sets the processor at the highest speed during power-on self-test processing for hardware check of the computer system and bootstrap sequence processing.

6. The system according to claim 1, wherein the means for setting sets the processor at the highest speed until a predetermined program is loaded by bootstrap sequence processing.

7. The system according to claim 6, wherein the means for setting sets the processor at the highest speed until the loaded predetermined program accesses specific hardware.

8. The system according to claim 1, wherein the means for setting determines end of the start processing upon reception of a predetermined input event from a user.

9. The system according to claim 1, wherein the means for setting forcibly decreases the processing speed of the processor in response to occurrence of a predetermined warning event.

10. The system according to claim 1, wherein when occurrence of a predetermined warning event decreases the processing speed of the processor before start processing ends, the means for setting inhibits subsequent speed switching of the processor.

11. A computer system comprising:

a processor;

means for designating a user to designate a processing speed of the processor;

means for controlling the processing speed of the processor; and means for setting the processing speed by the means for controlling, setting the processing speed to a highest speed during a period for shutdown processing/suspend processing of the computer system, regardless of whether or not the user-designated speed is set.

12. The system according to claim 11, wherein the means for setting receives a notification from a loaded predetermined program which has been loaded.

13. The system according to claim 12, wherein the means for setting sets the processor at the highest speed until the loaded predetermined program accesses specific hardware.

14. The system according to claim 11, wherein the means for setting forcibly decreases the processing speed of the processor in response to occurrence of a predetermined warning event.

15. The system according to claim 11, wherein when occurrence of a predetermined warning event decreases the processing speed of the processor before the shutdown processing/suspend processing ends, the means for setting inhibits subsequent speed switching of the processor.

16. A processor speed control method applied to a computer system having a processor, comprising the steps of:

designating a user to designate a processing speed of the processor, and operating the processor at a highest speed during a period for start processing for the computer system, regardless of whether or not the user-designated speed is set.

17. The method according to claim 16, further comprising a step of setting the processing speed of the processor to the user-designated speed after a lapse of a predetermined period until user operation to the computer system is enabled upon completion of the start processing.

18. The method according to claim 16, further comprising forcibly decreasing the processing speed of the processor in response to occurrence of a predetermined warning event.

19. A processing speed control method applied to a computer system having a processor, comprising the steps of:

designating a user to designate a processing speed of the processor, and operating the processor at a highest speed during a period for shutdown processing/suspend processing of the computer system, regardless of whether or not the user-designated speed is set.

20. The method according to claim 19, further comprising a step of setting the processing speed of the processor to the user-designated speed after a lapse of a predetermined period until user operation to the computer system is enabled upon completion of return processing from a suspend state.

21. The method according to claim 19, further comprising forcibly decreasing the processing speed of the processor in response to occurrence of a predetermined warning event.

* * * * *